US012611860B2

(12) United States Patent
Mizouchi

(10) Patent No.: US 12,611,860 B2
(45) Date of Patent: Apr. 28, 2026

(54) DRIVE WAVEFORM GENERATION DEVICE, DRIVE WAVEFORM GENERATION METHOD AND PROGRAM, LIQUID JETTING DEVICE, AND PRINTING APPARATUS

(71) Applicant: FUJIFILM Corporation, Tokyo (JP)

(72) Inventor: Yuta Mizouchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 183 days.

(21) Appl. No.: 18/488,959

(22) Filed: Oct. 17, 2023

(65) Prior Publication Data

US 2024/0140088 A1 May 2, 2024

(30) Foreign Application Priority Data

Oct. 26, 2022 (JP) ................................ 2022-171481

(51) Int. Cl.
*B41J 2/045* (2006.01)

(52) U.S. Cl.
CPC ....... *B41J 2/04588* (2013.01); *B41J 2/04541* (2013.01); *B41J 2/04581* (2013.01)

(58) Field of Classification Search
None
See application file for complete search history.

(56) References Cited

U.S. PATENT DOCUMENTS

| | | | |
|---|---|---|---|
| 6,099,103 | A | 8/2000 | Takahashi |
| 6,419,336 | B1 | 7/2002 | Takahashi |
| 2019/0224967 | A1 | 7/2019 | Massucci |

FOREIGN PATENT DOCUMENTS

| | | |
|---|---|---|
| JP | 2014028447 | 2/2014 |
| JP | 2020093535 | 6/2020 |

OTHER PUBLICATIONS

"Search Report of Europe Counterpart Application", issued on Mar. 5, 2024, p. 1-p. 9.

*Primary Examiner* — Justin Seo
(74) *Attorney, Agent, or Firm* — JCIPRNET

(57) ABSTRACT

A drive waveform generated by a processor includes, within one drive period, a jetting pulse group for jetting a liquid droplet from a nozzle, and a voltage swing for preventing the liquid droplet from being jetted from the nozzle, three or more voltage swings are disposed after a first jetting pulse which is a last jetting pulse in the jetting pulse group, a start end of a first voltage swing immediately after the first jetting pulse is disposed at a position separated from a start end of the first jetting pulse by about a resonance pulse period, and a start end of a second voltage swing immediately after the first voltage swing is disposed at a position separated from the start end of the first voltage swing by about a resonance pulse width.

11 Claims, 15 Drawing Sheets

DRIVE WAVEFORM GENERATION DEVICE, DRIVE WAVEFORM GENERATION METHOD AND PROGRAM, LIQUID JETTING DEVICE, AND PRINTING APPARATUS

CROSS-REFERENCE TO RELATED APPLICATION

The present application claims priority under 35 U.S.C. § 119(a) to Japanese Patent Application No. 2022-171481 filed on Oct. 26, 2022, which is hereby expressly incorporated by reference, in its entirety, into the present application.

BACKGROUND OF THE INVENTION

1. Field of the Invention

The present invention relates to a drive waveform generation device, a drive waveform generation method and program, a liquid jetting device, and a printing apparatus, and particularly relates to a technique of stabilizing jetting of a liquid from a nozzle.

2. Description of the Related Art

In inkjet printing, it is known that a flying shape varies greatly depending on physical properties of an ink. Depending on the physical properties of the ink, a thread is likely to be long, and a satellite is generated. The satellite is an unnecessary liquid droplet generated by separation of the thread from a liquid droplet.

In a case in which the thread is long, the jetting is unstable, which causes deflection. In addition, in a case in which a satellite is generated, a dot shape in a case of landing may not be clean, and landing may occur at an unintended location. These may lead to image quality deterioration and device failure, so that it is necessary to suppress the thread. Further, mist, which is an atomized liquid droplet smaller than the satellite, and reverberation of a meniscus after the jetting affect jetting stability, so that it is necessary to suppress these for stable jetting.

JP2020-093535A discloses a technique of enhancing a satellite shortening effect at a trailing end of a jetting droplet by disposing a non jetting pulse with a satellite suppression effect in the first half of a waveform within one period and applying only the non-jetting pulse to a blank portion.

JP2014-028447A discloses a technique of outputting a micro-vibration pulse to improve a state of a meniscus of a nozzle after a jetting pulse in a waveform within one period.

SUMMARY OF THE INVENTION

However, in the technique disclosed in JP2020-093535A, since the non jetting pulse with the satellite suppression effect is not applied in a case of continuous jetting, the satellite may be generated. In addition, in the technique disclosed in JP2014-028447A, there is a problem in that the satellite cannot be suppressed with the micro-vibration pulse.

The present invention has been made in view of such circumstances, and an object thereof is to provide a drive waveform generation device, a drive waveform generation method and program, a liquid jetting device, and a printing apparatus that suppress a thread-forming length and satellite generation.

In order to achieve the above object, a first aspect of the present disclosure relates to a drive waveform generation device comprising: one or more processors; and one or more memories that store instructions executed by the one or more processors, in which the processor generates a drive waveform for driving a liquid droplet jetting element of a liquid jetting head having a nozzle that jets a liquid droplet, a pressure chamber that communicates with the nozzle, and the liquid droplet jetting element that pressurizes a liquid in the pressure chamber according to a supplied drive waveform, the drive waveform includes, within one drive period, a jetting pulse group including one or more jetting pulses for jetting the liquid droplet from the nozzle, and a voltage swing for preventing the liquid droplet from being jetted from the nozzle, three or more voltage swings are disposed after a first jetting pulse which is a last jetting pulse in the jetting pulse group, a start end of a first voltage swing, which is the voltage swing immediately after the first jetting pulse, is disposed at a position separated from a start end of the first jetting pulse by a first time, a start end of a second voltage swing, which is the voltage swing immediately after the first voltage swing, is disposed at a position separated from the start end of the first voltage swing by a second time, assuming that a period of two jetting pulses in which a velocity of the liquid droplet jetted in the two jetting pulses is the fastest is a resonance pulse period, the first time is 80% or more and 120% or less of the resonance pulse period, and assuming that a pulse width of one jetting pulse in which a velocity of the liquid droplet jetted in the one jetting pulse is the fastest is a resonance pulse width, the second time is 80% or more and 120% or less of the resonance pulse width. By driving the liquid droplet jetting element of the liquid jetting head with the drive waveform generated according to this aspect, it is possible to suppress the thread-forming length and the satellite generation.

It is preferable that a second aspect of the present disclosure provides the drive waveform generation device according to the first aspect, in which a start end of a third voltage swing, which is the voltage swing immediately after the second voltage swing of the drive waveform, is disposed at a position separated from the start end of the first voltage swing by a third time, and the third time is 80% or more and 120% or less of half of the resonance pulse period. By driving the liquid droplet jetting element of the liquid jetting head with the drive waveform generated according to this aspect, it is possible to suppress the thread-forming length and the satellite generation and to reduce mist.

It is preferable that a third aspect of the present disclosure provides the drive waveform generation device according to the first or second aspect, in which a start end of a fourth voltage swing, which is the voltage swing immediately after the third voltage swing of the drive waveform, is disposed at a position separated from the start end of the first voltage swing by a fourth time or a position separated from the start end of the third voltage swing by a fifth time, the fourth time is 80% or more and 120% or less of an even multiple of the resonance pulse width, or 80% or more and 120% or less of an integral multiple of the resonance pulse period, and the fifth time is 80% or more and 120% or less of an even multiple of the resonance pulse width, or 80% or more and 120% or less of an integral multiple of the resonance pulse period. By driving the liquid droplet jetting element of the liquid jetting head with the drive waveform generated according to this aspect, it is possible to suppress the thread-forming length and the satellite generation, to reduce mist, and to suppress reverberation of a meniscus.

It is preferable that a fourth aspect of the present disclosure provides the drive waveform generation device according to any one of the first to third aspects, in which a start end of a second jetting pulse, which is the jetting pulse immediately before the first jetting pulse of the drive waveform, is disposed at a position separated from the start end of the first jetting pulse by a sixth time, and a pulse width of the second jetting pulse is a seventh time, the sixth time is 80% or more and 120% or less of the resonance pulse period, and the seventh time is 80% or more and 120% or less of the resonance pulse width. By driving the liquid droplet jetting element of the liquid jetting head with the drive waveform generated according to this aspect, it is possible to suppress the satellite by coalescing a liquid droplet jetted by the first jetting pulse and a liquid droplet jetted by the second jetting pulse with the satellite.

It is preferable that a fifth aspect of the present disclosure provides the drive waveform generation device according to the fourth aspect, in which, in the drive waveform, the jetting pulse and a non-jetting pulse for preventing the liquid droplet from being jetted from the nozzle are non-disposed between the start end of the second jetting pulse and a position before the second jetting pulse and separated from the start end of the second jetting pulse by an eighth time, and the eighth time is 80% or more and 120% or less of the resonance pulse period. That is, a voltage is constant between the start end of the second jetting pulse and the position before the second jetting pulse and separated from the start end of the second jetting pulse by the eighth time. By driving the liquid droplet jetting element of the liquid jetting head with the drive waveform generated according to this aspect, it is possible to perform the jetting with the stable second jetting pulse and to suppress the satellite.

It is preferable that a sixth aspect of the present disclosure provides the drive waveform generation device according to any one of the first to fifth aspects, in which the liquid has a surface tension of 35 mN/m or less.

It is preferable that a seventh aspect of the present disclosure provides the drive waveform generation device according to any one of the first to fifth aspects, in which the liquid has a surface tension of 30 mN/m or less.

In order to achieve the above object, an eighth aspect of the present disclosure relates to a liquid jetting device comprising: the drive waveform generation device according to any one of the first to seventh aspects; and the liquid jetting head having the nozzle that jets the liquid droplet, the pressure chamber that communicates with the nozzle, and the liquid droplet jetting element that pressurizes the liquid in the pressure chamber according to the supplied drive waveform, in which the processor jets the liquid droplet from the nozzle by supplying the drive waveform generated by the drive waveform generation device to the liquid droplet jetting element. According to this aspect, it is possible to suppress the thread-forming length and the satellite generation.

In order to achieve the above object, a ninth aspect of the present disclosure relates to a printing apparatus comprising: the liquid jetting device according to the eighth aspect; and a relative moving mechanism that moves the liquid jetting head and a base material relative to each other, in which the processor prints an image on the base material by moving the liquid jetting head and the base material relative to each other and jetting the liquid droplet from the nozzle. According to this aspect, it is possible to suppress the thread-forming length and the satellite generation.

In order to achieve the above object, a tenth aspect of the present disclosure relates to a drive waveform generation method executed by one or more processors, the method comprising: causing the one or more processors to execute generating a drive waveform for driving a liquid droplet jetting element of a liquid jetting head having a nozzle that jets a liquid droplet, a pressure chamber that communicates with the nozzle, and the liquid droplet jetting element that pressurizes a liquid in the pressure chamber according to a supplied drive waveform, in which the drive waveform includes, within one drive period, a jetting pulse group including one or more jetting pulses for jetting the liquid droplet from the nozzle, and a voltage swing for preventing the liquid droplet from being jetted from the nozzle, three or more voltage swings are disposed after a first jetting pulse which is a last jetting pulse in the jetting pulse group, a start end of a first voltage swing, which is the voltage swing immediately after the first jetting pulse, is disposed at a position separated from a start end of the first jetting pulse by a first time, a start end of a second voltage swing, which is the voltage swing immediately after the first voltage swing, is disposed at a position separated from the start end of the first voltage swing by a second time, assuming that a period of two jetting pulses in which a velocity of the liquid droplet jetted in the two jetting pulses is the fastest is a resonance pulse period, the first time is 80% or more and 120% or less of the resonance pulse period, and assuming that a pulse width of one jetting pulse in which a velocity of the liquid droplet jetted in the one jetting pulse is the fastest is a resonance pulse width, the second time is 80% or more and 120% or less of the resonance pulse width. By driving the liquid droplet jetting element of the liquid jetting head with the drive waveform generated according to this aspect, it is possible to suppress the thread-forming length and the satellite generation.

In order to achieve the above object, an eleventh aspect of the present disclosure relates to a program causing a computer to execute the drive waveform generation method according to the tenth aspect. By driving the liquid droplet jetting element of the liquid jetting head with the drive waveform generated by the computer executing the program according to this aspect, it is possible to suppress the thread-forming length and the satellite generation. The present disclosure also includes a non-temporary computer-readable recording medium such as a compact disk-read only memory (CD-ROM) that stores the program according to the eleventh aspect.

According to the present invention, it is possible to suppress the thread-forming length and the satellite generation.

DESCRIPTION OF THE PREFERRED EMBODIMENTS

Hereinafter, preferred embodiments of the present invention will be described with reference to the accompanying drawings. In the description of each embodiment, illustration and description of parts common to the other embodiments will be omitted as appropriate.

Overall Configuration of Inkjet Printing Apparatus

Figure 1:
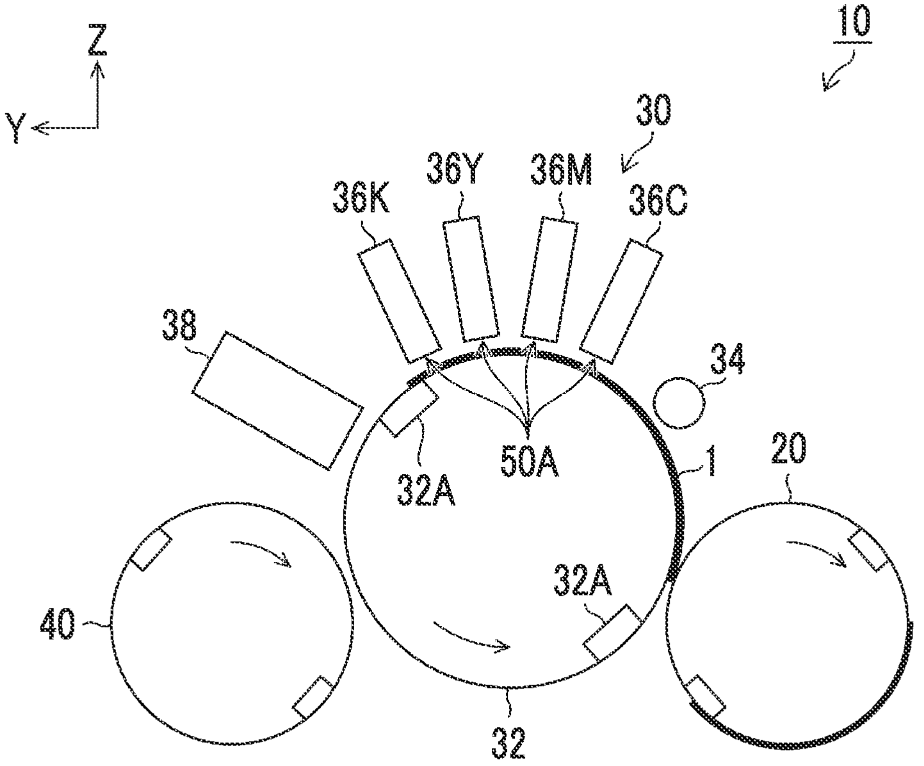
FIG. 1 is an overall configuration diagram showing an example of an inkjet printing apparatus.

FIG. 1 is an overall configuration diagram showing an example of an inkjet printing apparatus. An inkjet printing apparatus 10 is a sheet-type aqueous inkjet printer that prints an image by an inkjet method using an aqueous ink (an example of a "liquid") on paper 1 (an example of a "base material"). The inkjet printing apparatus 10 mainly comprises a transport drum 20 that transports the fed paper 1, an image recording unit 30 that prints an image on a printing surface of the paper 1, and a transport drum 40 that transports the paper 1 on which the image is printed.

The image recording unit 30 applies ink droplets, which are liquid droplets of an ink of each color, to the printing surface of the paper 1 while transporting the paper 1, and prints a color image. The image recording unit 30 comprises an image recording drum 32 that transports the paper 1, a paper pressing roller 34 that presses the paper 1 transported by the image recording drum 32 to bring the paper 1 into close contact with an outer peripheral surface of the image recording drum 32, inkjet heads 36C, 36M, 36Y, and 36K (an example of a "liquid jetting head") that jet ink droplets of respective colors of cyan (C), magenta (M), yellow (Y), and black (K) onto the paper 1, and an imaging unit 38 that reads the image printed on the paper 1.

The image recording drum 32 is means for transporting the paper 1 in the image recording unit 30, and is an example of a relative moving mechanism that moves the inkjet heads 36C, 36M, 36Y, and 36K and the paper 1 relative to each other. The image recording drum 32 is formed in a cylindrical shape, and is driven by a motor (not shown) to rotate about a center of the cylinder. A gripper 32A is provided on the outer peripheral surface of the image recording drum 32. The image recording drum 32 grips a leading end of the paper 1 with the gripper 32A and rotates by a motor (not shown), thereby transporting the paper 1 while winding the paper 1 around the outer peripheral surface.

In addition, a large number of suction holes (not shown) are formed on the outer peripheral surface of the image recording drum 32 in a predetermined pattern. The paper 1 wound around the outer peripheral surface of the image recording drum 32 is adhesively held on the outer peripheral surface of the image recording drum 32 by being sucked from the suction holes. As a result, the image recording drum 32 can transport the paper 1 with high smoothness. The mechanism for adhesively holding the paper 1 on the outer peripheral surface of the image recording drum 32 is not limited to an adsorption method using a negative pressure, and a method using electrostatic adsorption can also be adopted.

The grippers 32A are disposed at two locations on the outer peripheral surface of the image recording drum 32. The image recording drum 32 can transport two sheets of the paper 1 in one rotation by the two grippers 32A. The rotation of the transport drum 20 and the rotation of the image recording drum 32 are controlled such that timings of receiving and delivering the paper 1 are matched. Similarly, the rotation of the image recording drum 32 and the rotation of the transport drum 40 are controlled such that timings of receiving and delivering the paper 1 are matched. That is, the transport drum 20, the image recording drum 32, and the transport drum 40 are driven to have the same circumferential speed, and are driven such that positions of grippers thereof are aligned with each other.

The paper pressing roller 34 is formed of a rubber roller. The paper pressing roller 34 is installed in the vicinity of a paper receiving position of the image recording drum 32 by being pressed to abut on the outer peripheral surface of the image recording drum 32. The image recording drum 32 causes the paper 1 delivered from the transport drum 20 to pass between the outer peripheral surface thereof and the paper pressing roller 34, thereby bringing the paper 1 into close contact with the outer peripheral surface of the image recording drum 32.

Each of the inkjet heads 36C, 36M, 36Y, and 36K is formed of a line head corresponding to a paper width. The inkjet heads 36C, 36M, 36Y, and 36K are disposed at regular intervals along a transport path of the paper 1 by the image recording drum 32. Each of the inkjet heads 36C, 36M, 36Y, and 36K is disposed such that a nozzle surface 50A thereof faces the outer peripheral surface of the image recording drum 32. The inkjet heads 36C, 36M, 36Y, and 36K print an image on the printing surface of the paper 1 transported by the image recording drum 32 by jetting ink droplets from a plurality of nozzles 54 (see FIG. 3) formed on the nozzle surface 50A toward the image recording drum 32.

The imaging unit 38 is imaging means for capturing the image printed on the printing surface of the paper 1 by the inkjet heads 36C, 36M, 36Y, and 36K. The imaging unit 38 has a line sensor composed of a solid-state imaging element such as a charge-coupled device (CCD) or a complementary metal oxide semiconductor (CMOS), and an imaging optical system with a fixed focal point. The imaging unit 38 is installed on the downstream side of the inkjet head 36K at the tail end in a transport direction of the paper 1 by the image recording drum 32.

In the image recording unit 30 configured as described above, the image recording drum 32 receives the paper 1 transported by the transport drum 20. The image recording drum 32 rotates while gripping the leading end of the paper 1 with the gripper 32A, thereby transporting the paper 1. The paper pressing roller 34 brings the paper 1 into close contact with the outer peripheral surface of the image recording drum 32. The image recording drum 32 sucks the paper 1 from the suction holes, and adhesively holds the paper 1 on the outer peripheral surface of the image recording drum 32.

The inkjet heads 36C, 36M, 36Y, and 36K apply ink droplets of respective colors of cyan, magenta, yellow, and black onto the printing surface of the paper 1 and print a color image on the printing surface in a case in which the paper 1 passes through positions facing the inkjet heads 36C, 36M, 36Y, and 36K.

The imaging unit 38 reads the image printed on the printing surface of the paper 1 in a case in which the paper 1 passes through a position facing the imaging unit 38. The reading of the printed image is performed as necessary, and an examination is performed for a defective nozzle such as a nozzle with a jetting defect and/or a nozzle with jetting deflection causing the image defect by detecting an image defect such as a streak from the read image. In a case of performing the reading, the reading is performed in a state where the paper 1 is adhesively held on the image recording drum 32, so that the reading can be performed with high accuracy. In addition, since the reading is performed immediately after printing, an abnormality such as a nozzle with a jetting defect and/or a nozzle with jetting deflection can be immediately detected and can be promptly dealt with. As a result, useless printing can be prevented, and the occurrence of paper loss can be reduced as far as possible.

After that, the image recording drum 32 delivers the paper 1 to the transport drum 40.

Structure of Inkjet Head

Next, a structure of the inkjet head will be described. Structures of the inkjet heads 36C, 36M, 36Y, and 36K corresponding to the respective colors are common. Thus, hereinafter, the head will be designated by reference numeral 36 as a representative.

Figure 2:
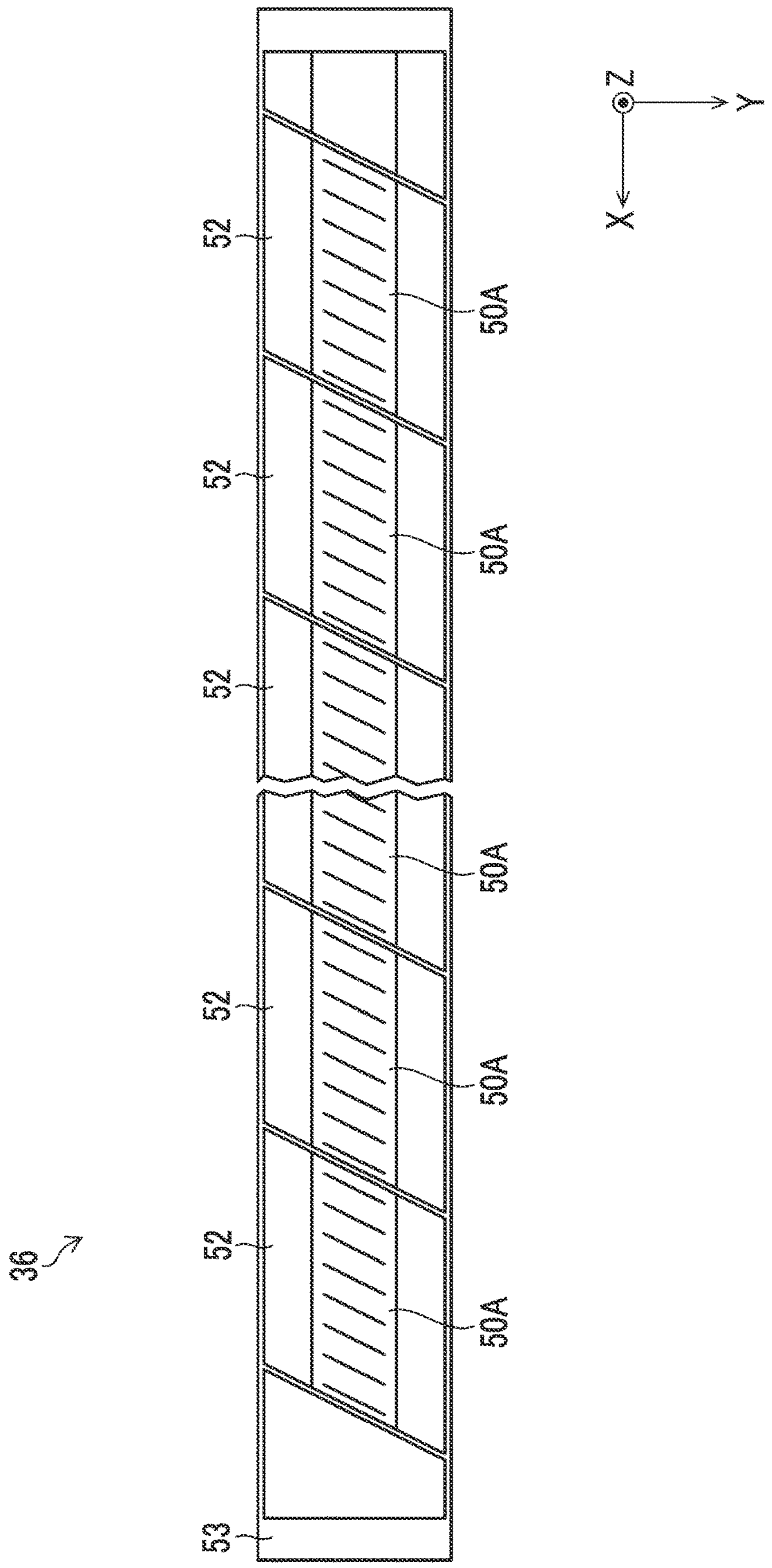
FIG. 2 is a bottom view of an inkjet head as viewed from a nozzle surface side.

FIG. 2 is a bottom view of an inkjet head 36 as viewed from a nozzle surface 50A side. The inkjet head 36 has a structure in which a plurality of head modules 52 are connected in a longitudinal direction of the inkjet head 36. Structures of the plurality of head modules 52 are common. The number of the head modules 52 is not limited and is appropriately determined according to the total length in a direction orthogonal to the transport direction of the paper 1.

The inkjet head 36 comprises a base frame 53. The plurality of head modules 52 are attached to the base frame 53. The base frame 53 comprises attachment portions corresponding to the number of the head modules 52 that can be attached. The base frame 53 comprises an adjustment portion that adjusts positions of the head modules 52. In FIG. 2, illustration of the attachment portions and the adjustment portion is omitted.

Figure 3:
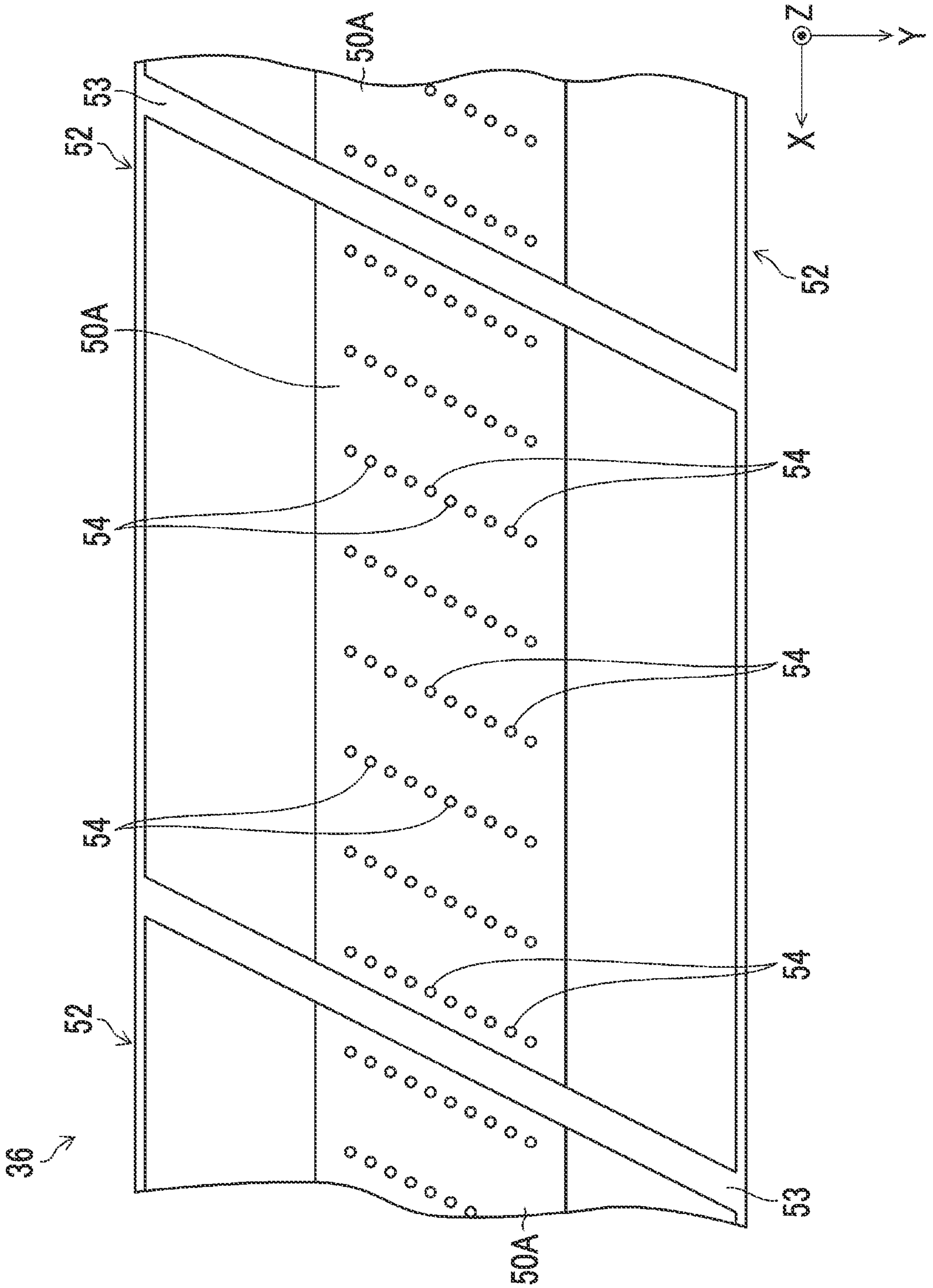
FIG. 3 is a diagram schematically showing a configuration example of a nozzle surface of the inkjet head.

FIG. 3 is a diagram schematically showing a configuration example of the nozzle surface 50A of the inkjet head 36. The positions of the respective head modules 52 in a vertical direction are adjusted such that the respective nozzle surfaces 50A constitute the same plane.

In the head module 52, the plurality of nozzles 54 that jet ink droplets are disposed on the nozzle surface 50A. The nozzles 54 are disposed in a matrix at a density that achieves a predetermined printing resolution. A projection nozzle row in which the plurality of nozzles 54 are projected in a direction orthogonal to the transport direction of the paper 1 is equivalent to one nozzle row in which the plurality of nozzles 54 are disposed at substantially equal intervals along the direction orthogonal to the transport direction of the paper 1.

The substantially equal intervals means that ink dots formed by using the inkjet head 36 have substantially equal intervals. For example, the concept of equal intervals also includes a case in which the nozzles 54 with slightly different intervals in consideration of the movement of the ink dots on the paper 1 due to manufacturing errors and landing interference are included.

The disposition of the nozzles 54 is not limited to the matrix disposition. Examples of the disposition of the nozzles 54 include a row of linear disposition, a V-shaped disposition, and a W-shaped disposition having the V-shaped disposition as a repeating unit.

Figure 4:
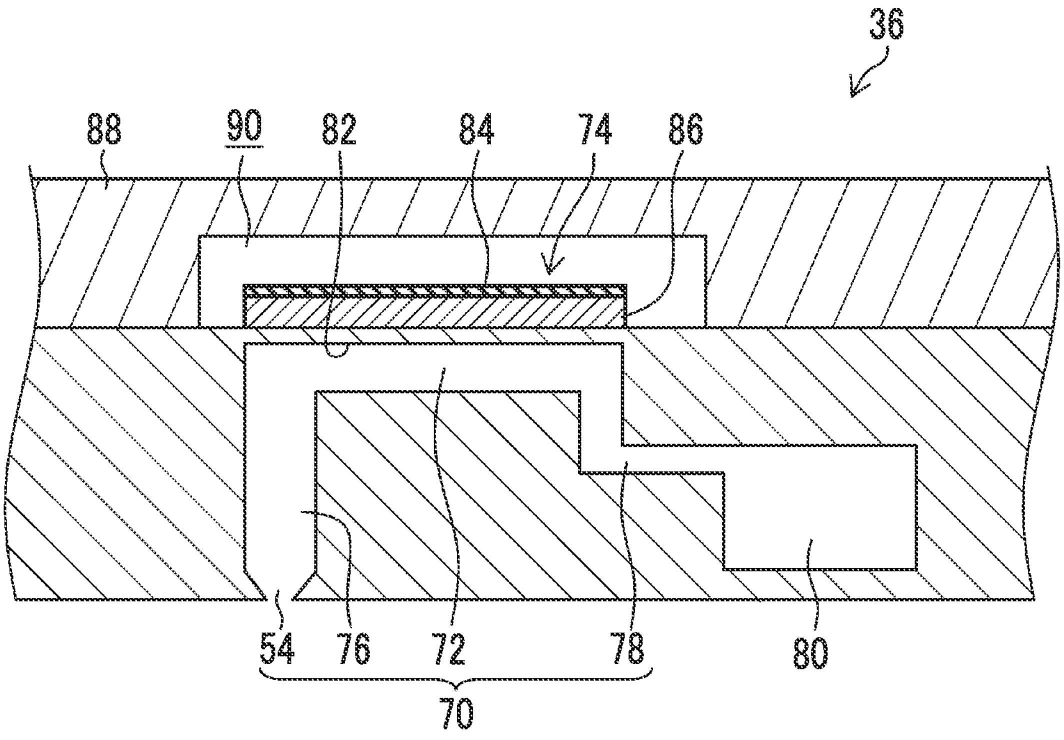
FIG. 4 is a cross-sectional view showing a structural example of the inkjet head.

FIG. 4 is a cross-sectional view showing a structural example of the inkjet head 36. The inkjet head 36 comprises an ejector 70, a supply-side common branch flow passage 80, a vibration plate 82, and a cover plate 88.

The ejector 70 comprises a nozzle 54, a pressure chamber 72, a piezoelectric element 74 (an example of a “liquid droplet jetting element”), a nozzle flow passage 76, and an individual supply passage 78. The nozzle 54 communicates with the pressure chamber 72 via the nozzle flow passage 76. The pressure chamber 72 communicates with the supply-side common branch flow passage 80 via the individual supply passage 78.

The piezoelectric element 74 comprises an individual electrode 84 and a piezoelectric material 86. The vibration plate 82 that constitutes a top surface of the pressure chamber 72 comprises a conductive layer (not shown) that functions as a common electrode corresponding to a lower electrode of the piezoelectric element 74. The pressure chamber 72, wall portions of other flow passage portions, the vibration plate 82, and the like are formed of silicon. A material of the vibration plate 82 is not limited to silicon, and an aspect is also possible in which the vibration plate may be formed of a non-conductive material such as a resin. The vibration plate 82 itself may be made of a metallic material such as stainless steel to serve as a common electrode.

A piezoelectric unimorph actuator is configured by a structure in which the piezoelectric element 74 formed of the piezoelectric material 86 and the individual electrode 84 is laminated on the vibration plate 82. In a case in which a drive voltage with a drive waveform is applied to the individual electrode 84, which is an upper electrode of the piezoelectric element 74, the piezoelectric material 86 is deformed. In a case in which the piezoelectric material 86 is deformed, the vibration plate 82 is bent, and a volume of the pressure chamber 72 is changed. Because of the change in volume of the pressure chamber 72, an ink in the pressure chamber 72 is pressurized, and the ink is jetted from the nozzle 54.

In a case in which the piezoelectric material 86 returns to its original state after the ink is jetted, the pressure chamber 72 is filled with a new ink from the supply-side common branch flow passage 80 through the individual supply passage 78. The operation of filling the pressure chamber 72 with the ink is referred to as refilling. A planar shape of the pressure chamber 72 is not particularly limited, and may have various shapes such as a quadrangular shape, a polygonal shape, a circular shape, and an elliptical shape.

The cover plate 88 is a member that holds a movable space 90 of the piezoelectric element 74 and seals a periphery of the piezoelectric element 74. A supply-side ink chamber and a recovery-side ink chamber (not shown) are formed above the cover plate 88. The supply-side ink chamber is coupled to a supply-side common main flow passage (not shown) via a communication path (not shown).

The recovery-side ink chamber is coupled to a recovery-side common main flow passage (not shown) via a communication path (not shown).

Configuration of Control System

Figure 5:
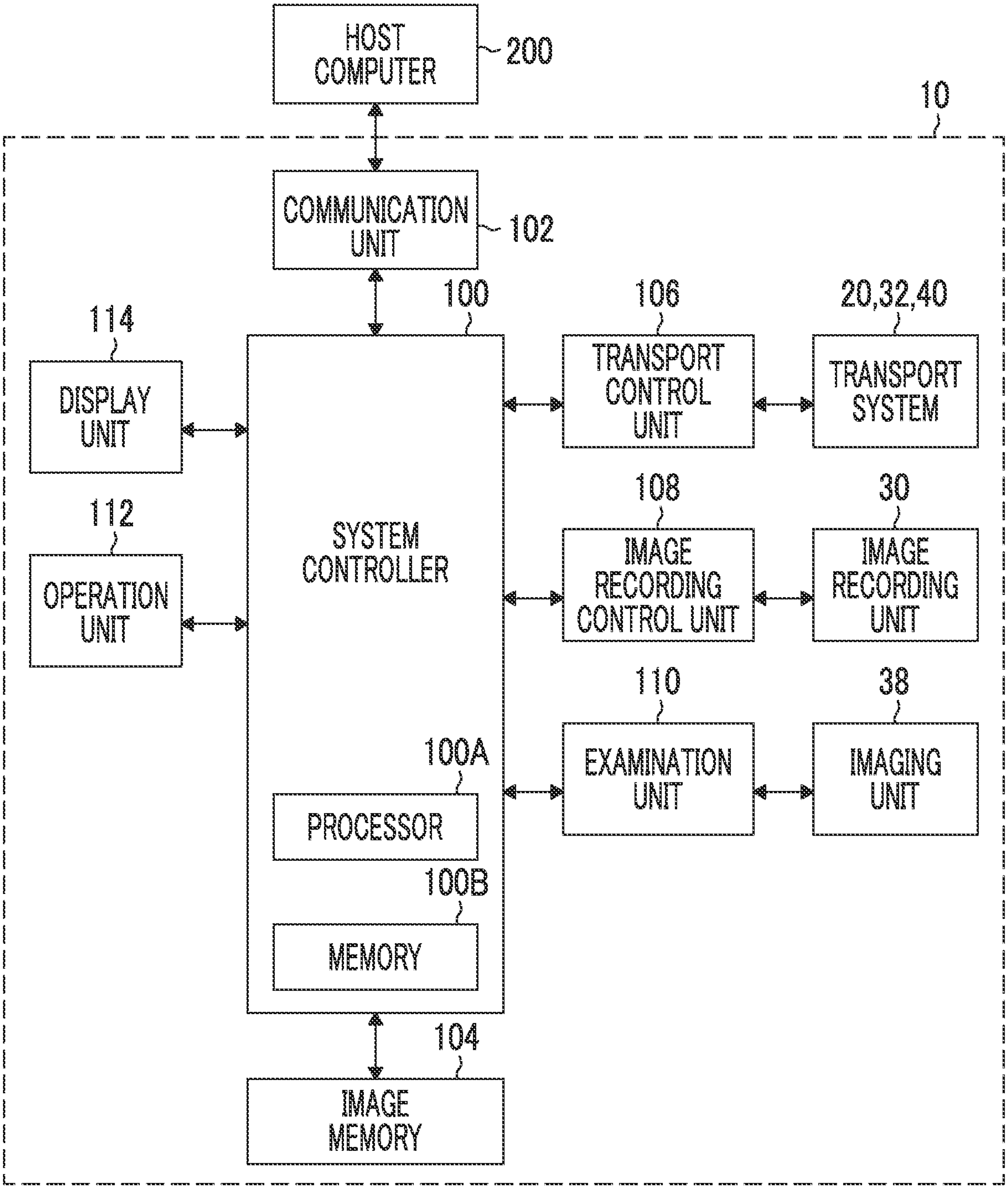
FIG. 5 is a block diagram showing a schematic configuration of a control system of the inkjet printing apparatus.

FIG. 5 is a block diagram showing a schematic configuration of a control system of the inkjet printing apparatus 10. The inkjet printing apparatus 10 comprises a system controller 100, a communication unit 102, an image memory 104, a transport control unit 106, an image recording control unit 108, an examination unit 110, an operation unit 112, and a display unit 114.

The system controller 100 functions as control means for integrally controlling each unit of the inkjet printing apparatus 10, and functions as operation means for performing various kinds of operation processing. In addition, the system controller 100 performs required signal processing on image data stored in the image memory 104 to generate dot data corresponding to each nozzle 54.

The system controller 100 comprises a processor 100A and a memory 100B. The processor 100A executes an instruction stored in the memory 100B. A hardware structure of the processor 100A is various processors as shown below. The various processors include a central processing unit (CPU) that is a general-purpose processor acting as various functional units by executing software (program), a graphics processing unit (GPU) that is a processor specialized in image processing, a programmable logic device (PLD) that is a processor of which a circuit configuration is changeable after manufacturing, such as a field programmable gate array (FPGA), a dedicated electric circuit that is a processor having a circuit configuration dedicatedly designed to execute a specific process, such as an application specific integrated circuit (ASIC), or the like.

One processing unit may be configured of one of these various processors, or may be configured of two or more processors of the same type or different types (for example, a plurality of FPGAs, a combination of a CPU and an FPGA, or a combination of a CPU and a GPU). Further, a plurality of functional units may be configured of one processor. As an example in which the plurality of functional units are configured of one processor, first, as typified by a computer such as a client or a server, one processor is configured of a combination of one or more CPUs and software and this processor acts as the plurality of functional units. Second, as typified by a system on chip (SoC) or the like, a processor that realizes the functions of the entire system including the plurality of functional units with one integrated circuit (IC) chip is used. As described above, the various functional units are configured by using one or more of the above described various processors as a hardware structure.

More specifically, the hardware structure of these various processors is an electric circuit (circuitry) in which circuit elements such as semiconductor elements are combined.

The memory 100B stores an instruction to be executed by the processor 100A. The memory 100B includes a random access memory (RAM) and a read only memory (ROM) (not shown). The processor 100A uses the RAM as a work region, executes software using various programs and parameters including a drive waveform generation program described below, which are stored in the ROM, and executes various kinds of processing of the inkjet printing apparatus 10 by using the parameters stored in the ROM or the like.

The communication unit 102 comprises a required communication interface, and transmits and receives data to and from a host computer 200 connected to the communication interface.

The image memory 104 functions as means for temporarily storing various kinds of data including the image data. The data is read from and written in the image memory 104 through the system controller 100. The image data loaded from the host computer 200 via the communication unit 102 is temporarily stored in the image memory 104.

The transport control unit 106 controls the driving of the transport drum 20, the image recording drum 32, and the transport drum 40, which are a transport system for the paper 1 in the inkjet printing apparatus 10. The transport control unit 106 controls the transport system in response to a command from the system controller 100 to transport the paper 1 without delay.

The image recording control unit 108 generates a drive waveform corresponding to the dot data generated by the system controller 100, and supplies the drive waveform to the individual electrode 84 of each piezoelectric element 74. That is, the image recording control unit 108 supplies the generated drive waveform to the inkjet heads 36C, 36M, 36Y, and 36K such that the image based on the dot data is printed on the paper 1 transported by the image recording drum 32, in response to a command from the system controller 100. As a result, ink droplets are jetted from the nozzles 54 of each of the inkjet heads 36C, 36M, 36Y, and 36K, dots are formed on the printing surface of the paper 1, and an image is printed on the printing surface.

The examination unit 110 specifies the defective nozzle from the plurality of nozzles 54 of the inkjet heads 36C, 36M, 36Y, and 36K by analyzing a reading result of a test pattern in the imaging unit 38.

The examination unit 110 specifies the nozzle 54, which is a defective nozzle with an abnormality in jetting. Based on data of a test pattern for detecting a defective nozzle that is stored in advance, the examination unit 110 causes the inkjet heads 36C, 36M, 36Y, and 36K to print the test pattern for detecting a defective nozzle on the paper 1. The examination unit 110 causes the imaging unit 38 to read the printed test pattern and analyzes a reading result of the imaging unit 38, thereby specifying a defective nozzle from the plurality of nozzles 54 of the inkjet heads 36C, 36M, 36Y, and 36K.

The defective nozzle includes, for example, a non-jetting nozzle in which an ink is not jetted at all, and a nozzle with jetting deflection in which a landing position error of the jetted ink exceeds an allowable value. The examination unit 110 causes a storage unit (not shown) to store the specified defective nozzle.

The image recording control unit 108 may correct the dot data such that dots to be formed by the defective nozzle specified by the examination unit 110 are complemented by the nozzle 54 adjacent to the defective nozzle.

The operation unit 112 is input means comprising an operation button, a keyboard, a touch panel, and the like. A user can input a print job for the inkjet printing apparatus 10 through the operation unit 112. Here, the print job refers to a set of processing units to be printed based on the image data. The operation unit 112 outputs the input print job to the system controller 100. The system controller 100 executes various kinds of processing in accordance with the print job input from the operation unit 112.

The display unit 114 comprises a display device such as a liquid crystal display (LCD) panel, and causes the display device to display required information in response to a command from the system controller 100.

Figure 6:
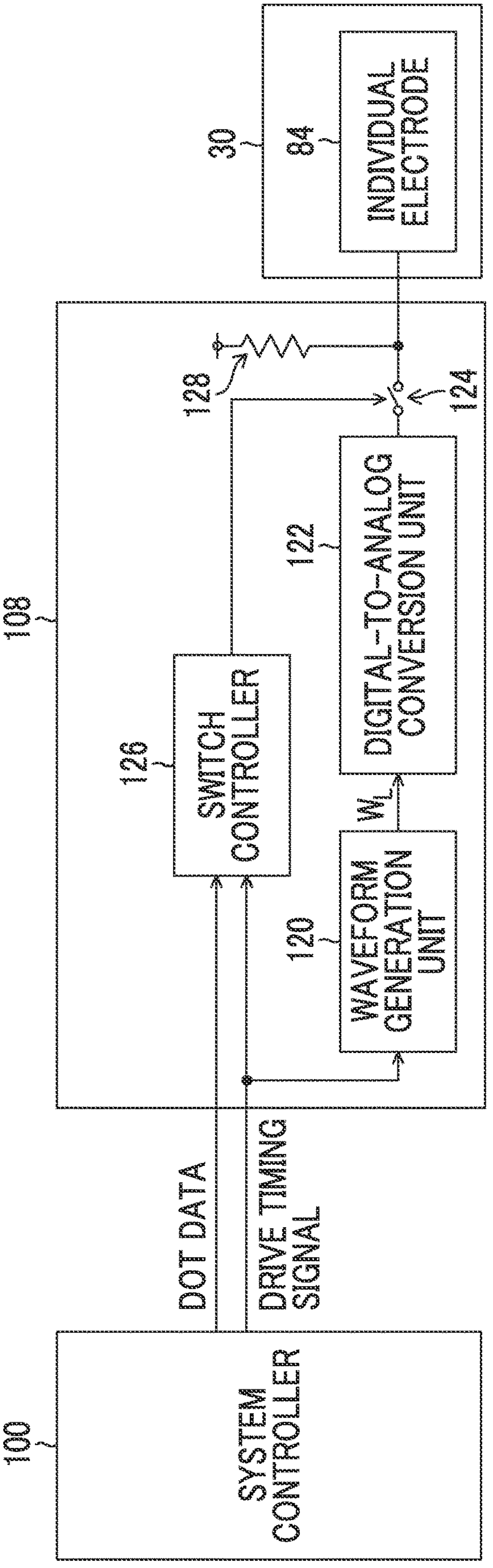
FIG. 6 is a block diagram showing an inside of an image recording control unit.

FIG. 6 is a block diagram showing an inside of the image recording control unit 108. FIG. 6 shows a portion of the image recording unit 30 corresponding to one individual electrode 84. The image recording control unit 108 and the image recording unit 30 constitute a liquid jetting device. The image recording control unit 108 comprises a waveform generation unit 120, a digital-to-analog conversion unit 122, a pulse selection switch 124, a switch controller 126, and a bias resistor 128.

The waveform generation unit 120 (an example of a "drive waveform generation device") executes a drive waveform generation method of generating a drive waveform W, which is a reference drive waveform, in synchronization with a drive timing signal input from the system controller 100. The digital-to-analog conversion unit 122 converts the drive waveform W that is an input digital signal into an analog signal and outputs the analog signal. The output of the digital-to-analog conversion unit 122 is input to one end of the pulse selection switch 124.

One end of the pulse selection switch 124 is connected to the output of the digital-to-analog conversion unit 122, and the other end is connected to the corresponding individual electrode 84. In addition, one terminal of the bias resistor 128 is connected to the individual electrode 84, and the other terminal of the bias resistor 128 is connected to a bias voltage which is a reference potential of the drive waveform.

The switch controller 126 controls on and off of the pulse selection switch 124 in synchronization with the drive timing signal input from the system controller 100 based on the dot data input from the system controller 100.

The pulse selection switch 124 is controlled to be turned on and off by the switch controller 126. In a case in which the pulse selection switch 124 is turned on, an analog drive waveform output from the digital-to-analog conversion unit 122 is supplied to the individual electrode 84. On the other hand, in a case in which the pulse selection switch 124 is turned off, the input of the individual electrode 84 is fixed (latched) to the bias voltage.

In the inkjet printing apparatus 10 configured as described above, the system controller 100 acquires the image data to be printed on the paper 1 from the host computer 200 via the communication unit 102. The system controller 100 stores the acquired image data in the image memory 104.

The system controller 100 performs required signal processing on the image data stored in the image memory 104 to generate dot data corresponding to each nozzle 54. The image recording control unit 108 controls the driving of the inkjet heads 36C, 36M, 36Y, and 36K of the image recording unit 30 in accordance with the generated dot data, and prints an image represented by the image data on a recording surface of the paper 1.

The dot data is generated by executing color conversion processing and halftone processing on the image data. The color conversion processing is processing of converting image data expressed in standard red green blue (sRGB) or the like into ink amount data of each color of an ink used in the inkjet printing apparatus 10. In the color conversion processing of the present embodiment, the image data is converted into ink amount data of each color of cyan, magenta, yellow, and black. The halftone processing is processing of converting the ink amount data of each color generated by the color conversion processing into dot data of each color by processing such as error diffusion. The dot data may be data having a plurality of gradations.

The system controller 100 controls the driving of the corresponding inkjet heads 36C, 36M, 36Y, and 36K in accordance with the dot data of each color generated as described above, thereby printing the image represented by the image data on the paper 1.

Definition of Terms

The term "pulse" refers to a rectangular, trapezoidal, or triangular voltage change over time, and refers to a part that involves a falling slope in which the voltage drops, a holding portion in which the voltage is constant, and a rising slope in which the voltage rises, in this order, in a case of a so-called pull-push pulse in which the pressure chamber 72 is decompressed and then pressurized, for example. In a case of a so-called push-pull pulse in which the pressure chamber 72 is pressurized and then depressurized, the term "pulse" refers to a part that involves a rising slope, a holding portion, and a falling slope in this order. Even in a case in which there is a holding portion of less than half of a "pulse width" described below in the middle of the slope, it may be regarded as one pulse. The rising slope and the falling slope of the voltage are each referred to as a "voltage swing".

Figure 7:
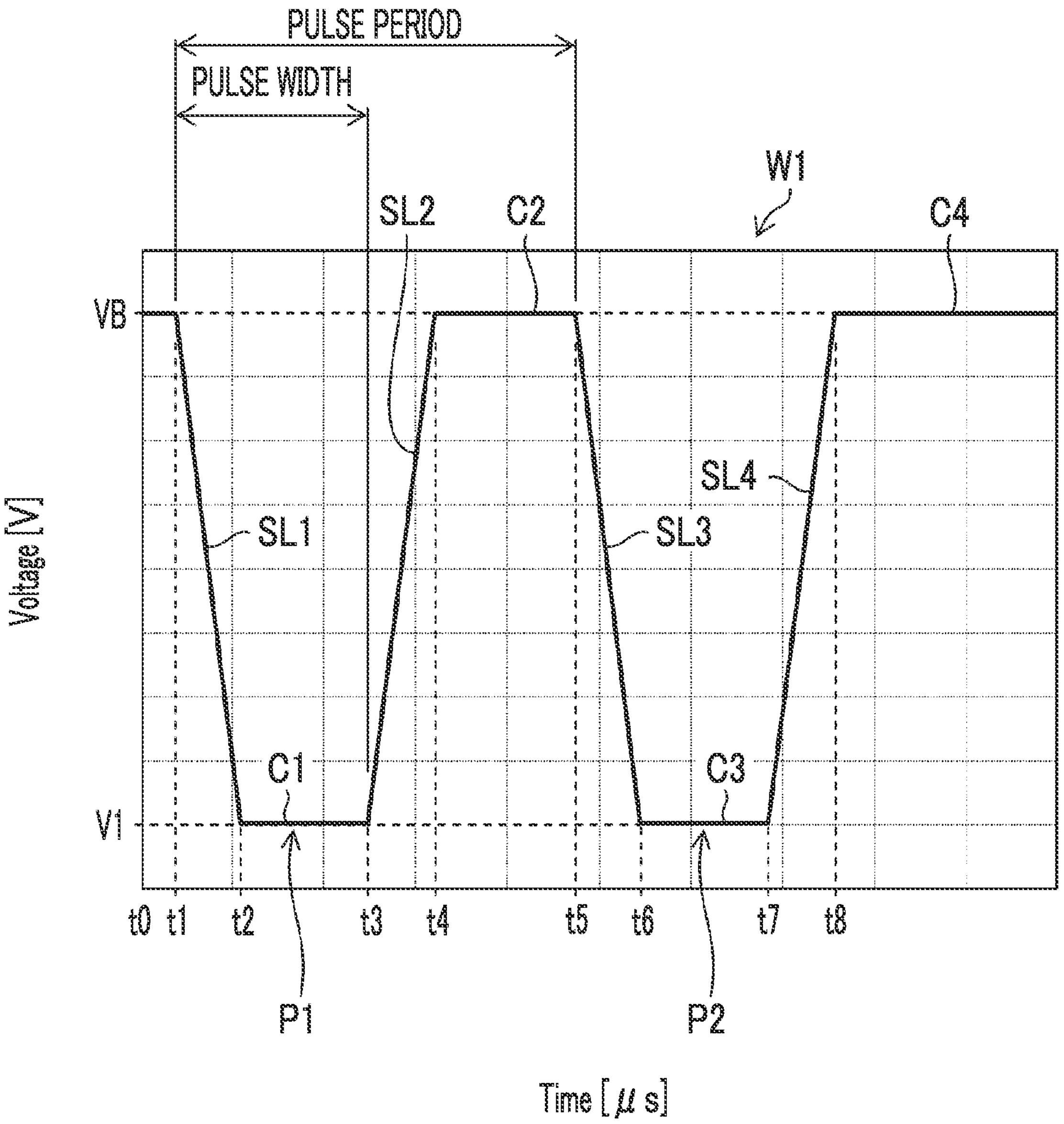
FIG. 7 is a diagram for explaining terms of a drive waveform.

FIG. 7 is a diagram for explaining terms of the drive waveform. A horizontal axis of FIG. 7 represents time (unit: μs), and a vertical axis represents a voltage (unit: V). A drive waveform W1 shown in FIG. 7 is constant at a bias voltage VB from a timing t0 to a timing t1. The term "bias voltage" is a reference potential of a substrate constituting the image recording control unit 108.

A slope SL1 shown in FIG. 7 is a falling slope in which the voltage drops from the bias voltage VB to a voltage V1 from the timing t1 to a timing t2. That is, the slope SL1 is a voltage swing whose start end is the timing t1 and terminal end is the timing t2, and whose amplitude is an absolute value of (VB−V1), that is, |VB−V1|.

A holding portion C1 shown in FIG. 7 is a holding portion that is constant at the voltage V1 from the timing t2 to a timing t3.

A slope SL2 shown in FIG. 7 is a rising slope in which the voltage rises from the voltage V1 to the bias voltage VB from the timing t3 to a timing t4. That is, the slope SL2 is a voltage swing whose start end is the timing t3 and terminal end is the timing t4, and whose amplitude is an absolute value of (V1−VB), that is, |V1−VB|.

A holding portion C2 shown in FIG. 7 is a holding portion that is constant at the bias voltage VB from the timing t4 to a timing t5.

A slope SL3 shown in FIG. 7 is a falling slope in which the voltage drops from the bias voltage VB to the voltage V1 from the timing t5 to a timing t6. A holding portion C3 shown in FIG. 7 is a holding portion that is constant at the voltage V1 from the timing t6 to a timing t7. A slope SL4 shown in FIG. 7 is a rising slope in which the voltage rises from the voltage V1 to the bias voltage VB from the timing t7 to a timing t8. A holding portion C4 shown in FIG. 7 is a holding portion that is constant at the bias voltage VB from the timing t8.

In such a drive waveform, the slope SL1, the holding portion C1, and the slope SL2 constitute a pulse P1. A start end of the pulse P1 is the timing t1, a terminal end of the pulse P1 is the timing t4, and a "pulse width" of the pulse P1 is (timing t3−timing t1). An amplitude of the pulse P1 is |VB−V1|.

Similarly, the slope SL3, the holding portion C3, and the slope SL4 constitute a pulse P2. A start end of the pulse P2 is the timing t5, a terminal end of the pulse P2 is the timing t8, and a "pulse width" of the pulse P2 is (timing t7−timing t5). An amplitude of the pulse P2 is |VB−V1|. A "pulse period" of the pulse P1 and the pulse P2 is (timing t5−timing t1).

In a case in which one pulse is applied to the individual electrode 84 of the piezoelectric element 74 and ink droplets fly away from the nozzle 54, the pulse is referred to as a "jetting pulse". That is, the term "jetting pulse" refers to a pulse for jetting ink droplets from the nozzle 54. In addition, in a case in which one pulse is applied to the individual electrode 84 of the piezoelectric element 74 and ink droplets do not move away from the nozzle 54, the pulse is referred to as a "non-jetting pulse". That is, the term "non-jetting pulse" refers to a pulse for preventing ink droplets from being jetted from the nozzle 54.

The term "resonance pulse width" refers to a pulse width of a single pulse in which a velocity of ink droplets is the fastest in a case in which the ink droplets are jetted from the nozzle 54 by one jetting pulse (single pulse) by changing the pulse width. The "resonance pulse width" is generally half (=Tc/2) of a Helmholtz vibration period Tc or an acoustic length AL. The Helmholtz vibration period Tc is a natural period of the entire vibration system determined from an ink flow passage system, an ink, and dimensions, materials, and physical property values of the piezoelectric element. The acoustic length AL is time that is half of a natural vibration period of the ink flow passage system.

The term "resonance pulse period" refers to a pulse period of double pulses in which a velocity of ink droplets is the fastest in a case in which the ink droplets are jetted from the nozzle 54 by two jetting pulses (double pulses) by changing the pulse period. The "resonance pulse period" may be the Helmholtz vibration period Tc, but may be longer than the Helmholtz vibration period Tc.

Problem of Drive Waveform in Related Art

The drive waveform is closely related to the physical properties of the ink and the structure of the inkjet head. In particular, the satellite is greatly affected by a surface tension of the ink. In order to spread the ink droplets on a base material such as paper, it is preferable that the surface tension of the ink is low. However, in a case in which the surface tension of the ink is low, a thread is likely to stretch in a case in which jetting is performed, and the ink is likely to be divided into a main droplet and small droplets (satellites) after the thread is broken. That is, even with the same waveform, the satellite is less likely to be generated in a case in which the surface tension of the ink is relatively high, and the satellite is likely to be generated in a case in which the surface tension is relatively low.

In general, the drive waveform is often set for the purpose of suppressing reverberation of a meniscus, suppressing a satellite, or the like in a case in which there is a non-jetting waveform portion after a first jetting pulse disposed at the last of a jetting pulse group. In a case in which satellite suppression is performed, it is said that it is effective to dispose two voltage swings, that is, one non jetting pulse at a position of resonance after the first jetting pulse.

Figure 8:
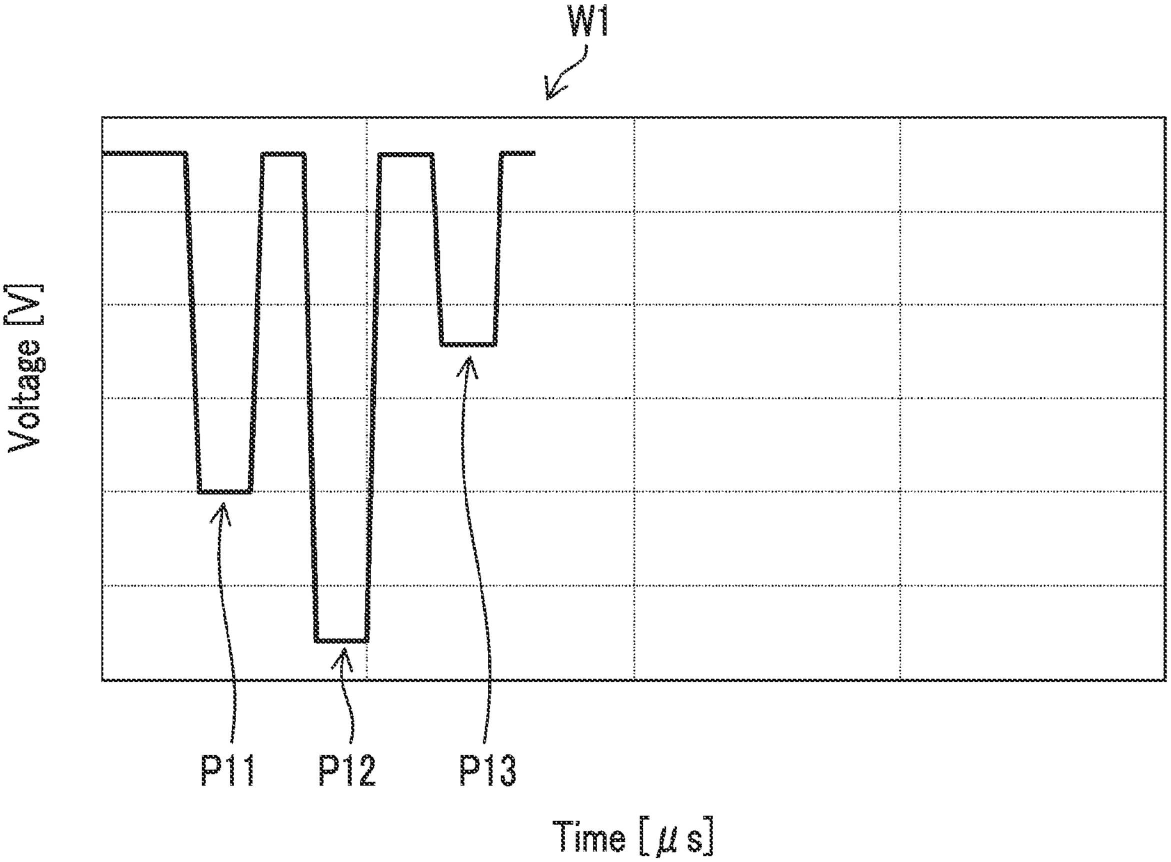
FIG. 8 is a diagram showing an example of a drive waveform in the related art.

FIG. 8 is a diagram showing an example of a drive waveform in the related art, and here, one drive period is shown. A horizontal axis of FIG. 8 represents time (unit: μs), and a vertical axis represents a voltage (unit: V). A drive waveform W1 shown in FIG. 8 includes a jetting pulse P11, a jetting pulse P12, and a non-jetting pulse P13, within one drive period. The non-jetting pulse P13 is disposed at a position of resonance of the jetting pulse P12.

Figure 9:
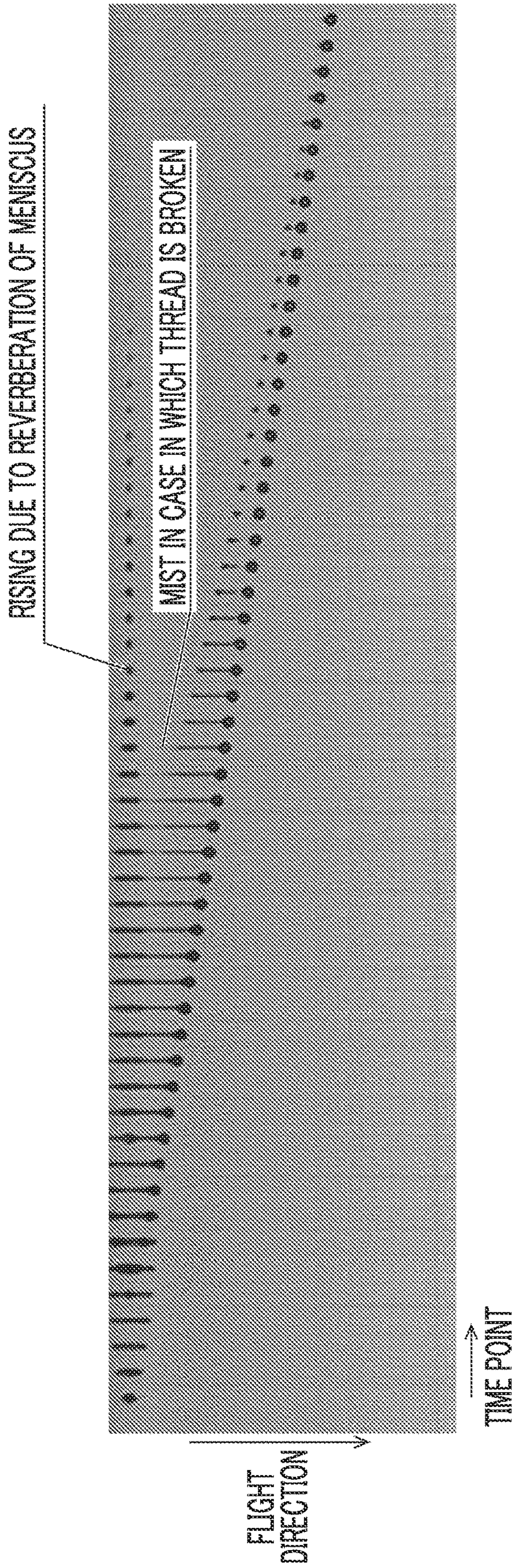
FIG. 9 is a series of photographs acquired by stroboscopically imaging a state of flight of ink droplets jetted from a nozzle in a case in which a drive waveform is applied to an individual electrode of a piezoelectric element, at regular time intervals.

FIG. 9 is a series of photographs acquired by stroboscopically imaging a state of flight of ink droplets jetted from the nozzle 54 in a case in which the drive waveform W1 is applied to the individual electrode 84 of the piezoelectric element 74, at regular time intervals. A vertical direction of FIG. 9 is a flight direction of the ink droplet, and the ink droplet flies from an upper side to a lower side of FIG. 9. In addition, the photographs at respective time points are arranged in order along a horizontal direction of FIG. 9. Accordingly, FIG. 9 shows a time-series change of the ink droplet from a left side to a right side of FIG. 9. As shown in FIG. 9, in a case in which the drive waveform W1 is applied, a thread is shortened due to the effect of pushing out a trailing end of the liquid column by the non-jetting pulse P13, thereby suppressing the satellite. However, mist is generated in a case in which the thread is broken. In addition, rising due to the reverberation of the meniscus occurs in the nozzle 54 after jetting.

Figure 10:
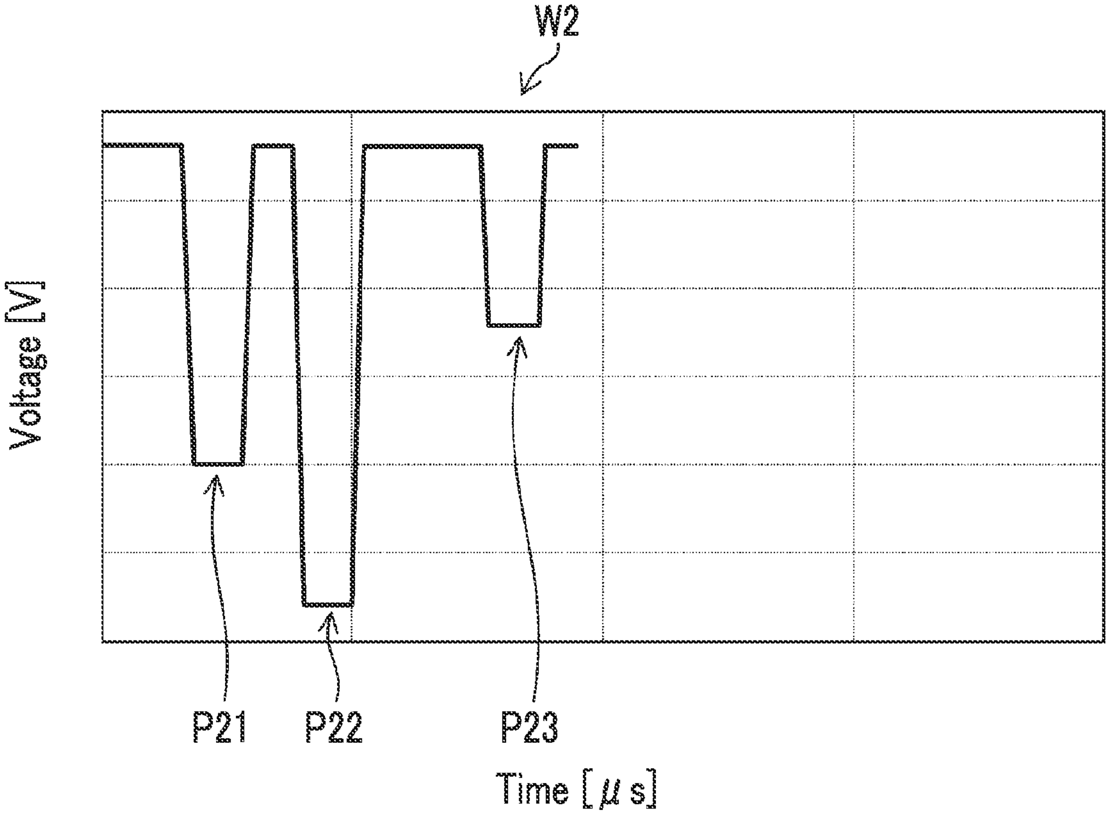
FIG. 10 is a diagram showing another example of a drive waveform in the related art.

FIG. 10 is a diagram showing another example of a drive waveform in the related art in the same manner as in FIG. 8, and shows one drive period. A drive waveform W2 shown in FIG. 10 includes a jetting pulse P21, a jetting pulse P22, and a non jetting pulse P23 within one drive period, and the non-jetting pulse P23 is disposed at a position opposite to a position of resonance of the jetting pulse P22.

Figure 11:
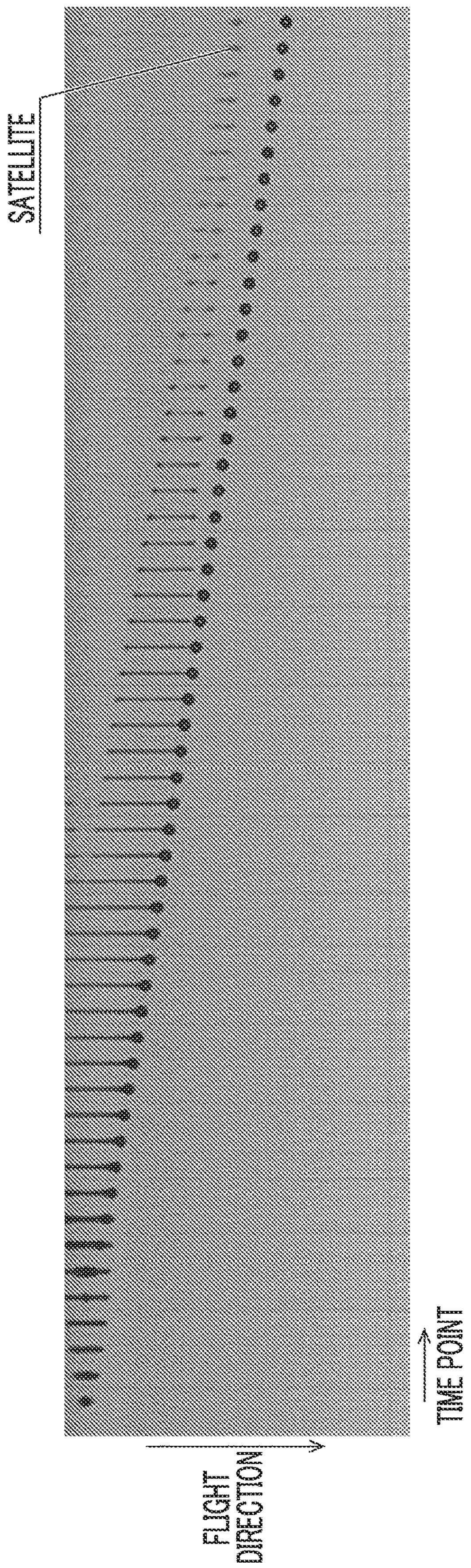
FIG. 11 is a series of photographs of ink droplets in a case in which a drive waveform is applied to the individual electrode of the piezoelectric element.

FIG. 11 is a diagram showing a series of photographs of ink droplets in a case in which the drive waveform W2 is applied to the individual electrode 84 of the piezoelectric element 74, in the same manner as in FIG. 9. As shown in FIG. 11, in a case in which the drive waveform W2 is applied, the non-jetting pulse P23 applies force in an opposite direction to the jetted ink droplet, so that the thread can be broken to suppress the mist or the reverberation of the meniscus. However, the satellite is generated.

In this way, it was found that only one non-jetting pulse for suppressing a satellite, that is, only two voltage swings generate a large amount of mist and cannot suppress the reverberation of the meniscus because the moment at which the thread is broken and the vibration of the meniscus are left to the movement of the fluid. Since the generation of mist and the reverberation of the meniscus have a great influence on stable jetting, it is necessary to take measures.

Drive Waveform of Present Disclosure

The drive waveform of the present disclosure includes, within one drive period for forming one pixel by applying ink droplets to the printing surface of the paper 1, a jetting pulse group including one or more jetting pulses for jetting the ink droplets from the nozzle 54, and three or more voltage swings for preventing the ink droplets from being jetted from the nozzle 54 after the jetting pulse group. That is, a voltage swing is further disposed after two voltage swings for preventing the ink droplets from being jetted. As a result, the mist and the reverberation of the meniscus are suppressed.

Figure 12:
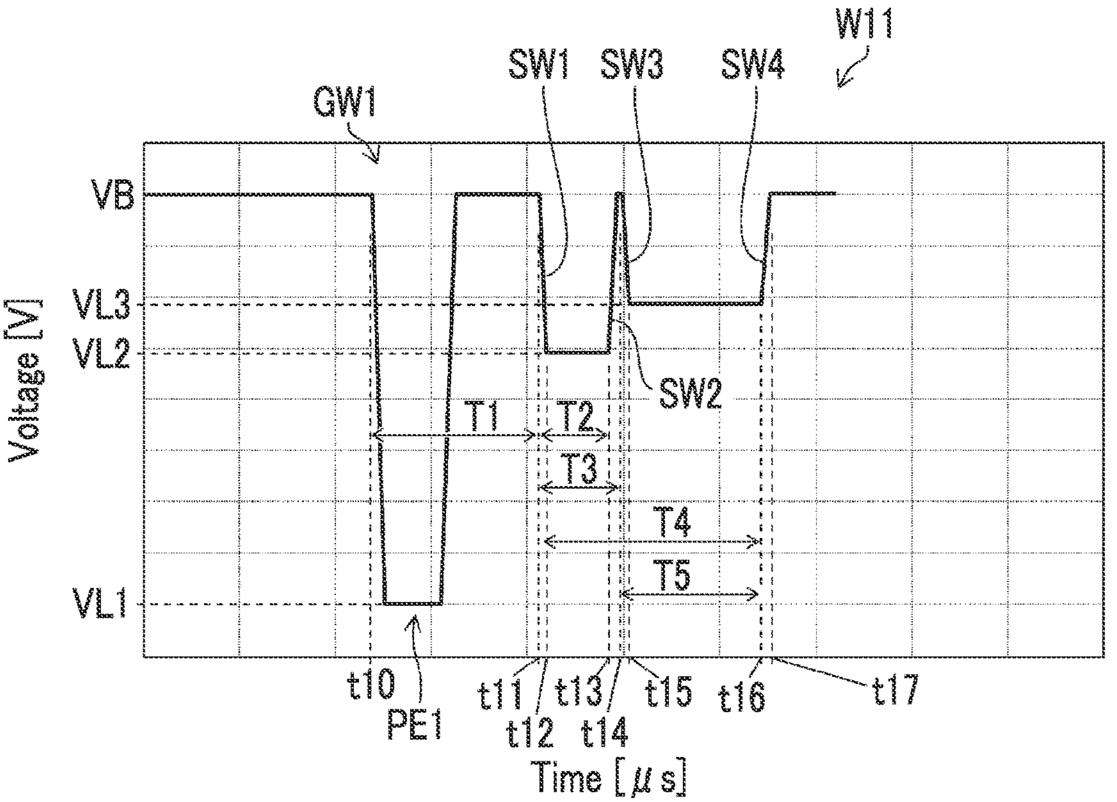
FIG. 12 is a diagram showing an example of a drive waveform of the present disclosure.

FIG. 12 is a diagram showing an example of the drive waveform of the present disclosure in the same manner as in FIG. 8, and shows one drive period. A drive waveform W11 shown in FIG. 12 includes a jetting pulse group GW1, a first voltage swing SW1, a second voltage swing SW2, a third voltage swing SW3, and a fourth voltage swing SW4 within one drive period.

The jetting pulse group GW1 includes a first jetting pulse PE1 for jetting ink droplets from the nozzle 54. The first jetting pulse PE1 has an amplitude of |VB−VL1| and a pulse width equal to a resonance pulse width. As an example, the first jetting pulse PE1 has an amplitude of 30 V and a pulse width of 2.4 μs. The pulse width of the first jetting pulse PE1 need only be 80% or more and 120% or less of the resonance pulse width. The pulse width of the first jetting pulse PE1 may be 70% or more and 130% or less of the resonance pulse width, or may be 90% or more and 110% or less of the resonance pulse width. The first jetting pulse PE1 may be a triangular wave.

After the first jetting pulse PE1 which is the last jetting pulse in the jetting pulse group GW1, four voltage swings, that is, the first voltage swing SW1, the second voltage swing SW2, the third voltage swing SW3, and the fourth voltage swing SW4 are disposed (an example of the phrase "three or more voltage swings are disposed"). The first voltage swing SW1, the second voltage swing SW2, the third voltage swing SW3, and the fourth voltage swing SW4 prevent ink droplets from being jetted from the nozzle 54.

The first voltage swing SW1 is a falling slope in which the voltage linearly drops from a bias voltage VB to a voltage VL2 from a timing t11 to a timing t12. As an example, the time from the timing t11 to the timing t12 is 0.25 μs. The second voltage swing SW2 is a rising slope in which the voltage linearly rises from the voltage VL2 to the bias voltage VB from a timing t13 to a timing t14.

A start end (timing t11) of the first voltage swing SW1 is disposed at a position separated from a start end (timing t10) of the first jetting pulse PE1 by a first time T1. The first time T1 is 80% or more and 120% or less of the resonance pulse period. The first time T1 may be 70% or more and 130% or less of the resonance pulse period, or may be 90% or more and 110% or less of the resonance pulse period.

In addition, a start end (timing t13) of the second voltage swing SW2 is disposed at a position separated from the start end (timing t11) of the first voltage swing SW1 by a second time T2. The second time T2 is 80% or more and 120% or less of the resonance pulse width. The second time T2 may be 70% or more and 130% or less of the resonance pulse width, or may be 90% or more and 110% or less of the resonance pulse width. The first voltage swing SW1 and the second voltage swing SW2 constitute a non-jetting pulse together with a holding portion (timing t12 to timing t13) between the first voltage swing SW1 and the second voltage swing SW2. A terminal end of the first voltage swing SW1 may be the timing t13 which is the same as the start end of the second voltage swing SW2. In this case, the first voltage swing SW1 and the second voltage swing SW2 constitute a non-jetting pulse of a triangular wave.

The third voltage swing SW3 is a falling slope in which the voltage linearly drops from the bias voltage VB to a voltage VL3 from a timing t14 to a timing t15. The fourth voltage swing SW4 is a rising slope in which the voltage linearly rises from the voltage VL3 to the bias voltage VB from a timing t16 to a timing t17.

A start end (timing t14) of the third voltage swing SW3 is disposed at a position separated from the start end (timing t11) of the first voltage swing SW1 by a third time T3. The third time T3 is 80% or more and 120% or less of half of the resonance pulse period. The third time T3 may be 70% or more and 130% or less of half of the resonance pulse period, or may be 90% or more and 110% or less of half of the resonance pulse period.

By disposing the third voltage swing SW3 at such a position, force for breaking the thread is applied, and thus the generation of mist can be suppressed. It is preferable that the position of the third voltage swing SW3 is located at a position where the mist can be suppressed while exhibiting the best satellite suppression effect before and after the position of half of the resonance pulse period from the start end of the first voltage swing SW1.

A start end (timing t16) of the fourth voltage swing SW4 is disposed at a position separated from the start end (timing t11) of the first voltage swing SW1 by a fourth time T4, or at a position separated from the start end (timing t14) of the third voltage swing SW3 by a fifth time T5. The fourth time T4 may be 80% or more and 120% or less of an even multiple of the resonance pulse width, or 80% or more and 120% or less of an integral multiple of the resonance pulse period. The fourth time T4 may be 70% or more and 130% or less of an even multiple of the resonance pulse width, or 70% or more and 130% or less of an integral multiple of the resonance pulse period, and may be 90% or more and 110% or less of an even multiple of the resonance pulse width, or 90% or more and 110% or less of an integral multiple of the resonance pulse period. The fifth time T5 may be 80% or more and 120% or less of an even multiple of the resonance pulse width, or 80% or more and 120% or less of an integral multiple of the resonance pulse period. The fifth time T5 may be 70% or more and 130% or less of an even multiple of the resonance pulse width, or 70% or more and 130% or less of an integral multiple of the resonance pulse period, and may be 90% or more and 110% or less of an even multiple of the resonance pulse width, or 90% or more and 110% or less of an integral multiple of the resonance pulse period.

By disposing the fourth voltage swing SW4 at such a position, vibration having a phase opposite to that of the meniscus is applied, so that the reverberation of the meniscus can be suppressed. It is preferable that the fourth voltage swing SW4 is disposed at an effective position depending to which of the reverberation of the first voltage swing SW1 and the second voltage swing SW2, or the reverberation of the third voltage swing SW3 remains.

An amplitude of the first voltage swing SW1 and the second voltage swing SW2 is smaller than the amplitude of the first jetting pulse PE1. That is, a relationship of $|VB-VL1|>|VB-VL2|$ is satisfied. Here, a relationship of $|VB-VL1|>|VB-VL2|\times 2$ is satisfied.

In addition, an amplitude of the third voltage swing SW3 and the fourth voltage swing SW4 is smaller than the amplitude of the first voltage swing SW1 and the second voltage swing SW2. That is, a relationship of $|VB-VL2|>|VB-VL3|$ is satisfied. Here, a relationship of $|VB-VL1|>|VB-VL3|\times 3$ is satisfied.

In a case in which the drive waveform W11 configured as described above is applied to the individual electrode 84 of the piezoelectric element 74, first, ink droplets are jetted from the nozzle 54 by the first jetting pulse PE1. After that, the thread is broken by the first voltage swing SW1 and the second voltage swing SW2 to suppress the satellite.

Subsequently, the mist is suppressed by the third voltage swing SW3. Further, the reverberation of the meniscus is suppressed by the fourth voltage swing SW4.

The jetted ink droplets land on the paper 1. As a result, one dot is formed on the printing surface of the paper 1. That is, in the drive waveform W11, one pixel is formed by the jetting pulse group GW1 included within one drive period. In addition, the satellite and mist are suppressed in the dot, so that a high-quality pixel can be formed. In addition, since the reverberation of the meniscus after jetting is suppressed, the jetting stability can be improved.

Figure 13:
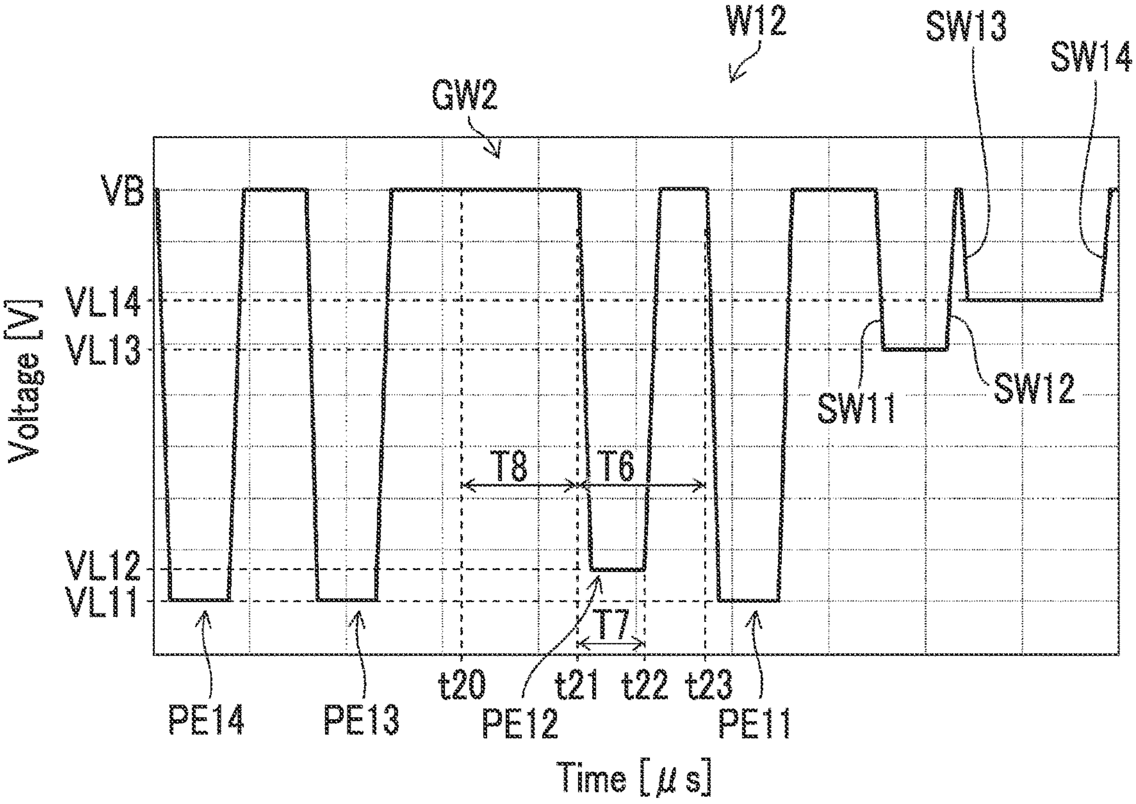
FIG. 13 is a diagram showing another example of a drive waveform of the present disclosure.

FIG. 13 is a diagram showing another example of the drive waveform of the present disclosure in the same manner as in FIG. 8, and shows one drive period. A drive waveform W12 shown in FIG. 13 includes a jetting pulse group GW2, a first voltage swing SW11, a second voltage swing SW12, a third voltage swing SW13, and a fourth voltage swing SW14 within one drive period.

The jetting pulse group GW2 includes a first jetting pulse PE11, a second jetting pulse PE12, a third jetting pulse PE13, and a fourth jetting pulse PE14 for jetting ink droplets from the nozzle 54. Each of the first jetting pulse PE11, the second jetting pulse PE12, the third jetting pulse PE13, and the fourth jetting pulse PE14 has a bias voltage at a start end and a terminal end. That is, in the jetting pulse group GW2, all the jetting pulses return to the bias voltage after being output.

The first jetting pulse PE11 is the last jetting pulse in the jetting pulse group GW2. The first jetting pulse PE11 has an amplitude of |VB−VL11| and a pulse width equal to a resonance pulse width.

The second jetting pulse PE12 is a jetting pulse immediately before the first jetting pulse PE11. A start end (timing t21) of the second jetting pulse PE12 is disposed at a position separated from the start end (timing t23) of the first jetting pulse PE11 by a sixth time T6. The sixth time T6 is 80% or more and 120% or less of the resonance pulse period. The sixth time T6 may be 70% or more and 130% or less of the resonance pulse period, or may be 90% or more and 110% or less of the resonance pulse period. The second jetting pulse PE12 has an amplitude of |VB−VL12| and a pulse width (timing t21 to timing t22) equal to a seventh time T7. The seventh time T7 is 80% or more and 120% or less of the resonance pulse width. The seventh time T7 may be 70% or more and 130% or less of the resonance pulse width, or 90% or more and 110% or less of the resonance pulse width.

It is preferable that the position of the start end of the second jetting pulse PE12 is located at a position where the satellite is closest to the main droplet in a case in which the position separated from the start end of the first jetting pulse PE11 by the resonance pulse period is changed back and forth and the positions are compared at the same velocity of the main droplet.

The third jetting pulse PE13 is a jetting pulse immediately before the second jetting pulse PE12. The start end of the third jetting pulse PE13 is disposed at a position separated from the start end of the second jetting pulse PE12 by about twice the resonance pulse period. The third jetting pulse PE13 has an amplitude of |VB−VL11| and a pulse width which is approximately equal to a resonance pulse width.

The jetting pulse for jetting the ink droplets from the nozzle 54 and the non-jetting pulse for preventing the ink droplets from being jetted from the nozzle 54 are non-disposed between the start end (timing t21) of the second jetting pulse PE12 and a position (timing t20) before the second jetting pulse PE12 and separated from the start end of the second jetting pulse PE12 by an eighth time T8. The eighth time T8 is 120% of the resonance pulse period. The eighth time T8 may be 130% of the resonance pulse period, or may be 110% of the resonance pulse period. Here, the bias voltage VB is constant between the third jetting pulse PE13 and the second jetting pulse PE12. As a result, the velocity of the ink droplets jetted by the second jetting pulse PE12 can be suppressed, and the satellite can be suppressed.

The fourth jetting pulse PE14 is a jetting pulse immediately before the third jetting pulse PE13. The start end of the fourth jetting pulse PE14 is disposed at a position separated from the start end of the third jetting pulse PE13 by about the resonance pulse period. The fourth jetting pulse PE14 has an amplitude of |VB−VL11| and a pulse width which is approximately equal to a resonance pulse width.

The first voltage swing SW11, the second voltage swing SW12, the third voltage swing SW13, and the fourth voltage swing SW14 prevent ink droplets from being jetted from the nozzle 54.

The dispositions of the first voltage swing SW11, the second voltage swing SW12, the third voltage swing SW13, and the fourth voltage swing SW14 are the same as the dispositions of the first voltage swing SW1, the second voltage swing SW2, the third voltage swing SW3, and the fourth voltage swing SW4 of the drive waveform W11.

That is, a start end of the first voltage swing SW11 is disposed at a position separated from the start end of the first jetting pulse PE11 by the first time T1, and a start end of the second voltage swing SW12 is disposed at a position separated from the start end of the first voltage swing SW11 by the second time T2. In addition, the third voltage swing SW13 is disposed at a position separated from the start end of the first voltage swing SW11 by the third time T3. Further, a start end of the fourth voltage swing SW14 is disposed at a position separated from the start end of the first voltage swing SW11 by the fourth time T4, or at a position separated from the start end of the third voltage swing SW13 by the fifth time T5.

In addition, the amplitudes of the first voltage swing SW11, the second voltage swing SW12, the third voltage swing SW13, and the fourth voltage swing SW14 are the same as the amplitudes of the first voltage swing SW1, the second voltage swing SW2, the third voltage swing SW3, and the fourth voltage swing SW4 of the drive waveform W11.

In a case in which the drive waveform W12 configured as described above is applied to the individual electrode 84 of the piezoelectric element 74, first, four ink droplets with the respective jetting pulses are jetted from the nozzle 54 by the first jetting pulse PE11, the second jetting pulse PE12, the third jetting pulse PE13, and the fourth jetting pulse PE14.

After that, the thread is broken by the first voltage swing SW1 and the second voltage swing SW2 to suppress the satellite. Subsequently, the mist is suppressed by the third voltage swing SW3. Further, the reverberation of the meniscus is suppressed by the fourth voltage swing SW4.

The four ink droplets jetted from the nozzle 54 are coalesced before reaching the paper 1, and the coalesced ink droplets land on the paper 1. As a result, one dot is formed on the printing surface of the paper 1. That is, in the drive waveform W12, one pixel is formed by the jetting pulse group GW2 included within one drive period. The satellite and mist are suppressed in the dot, so that a high-quality pixel can be formed. In addition, since the reverberation of the meniscus after jetting is suppressed, the jetting stability can be improved.

Figure 14:
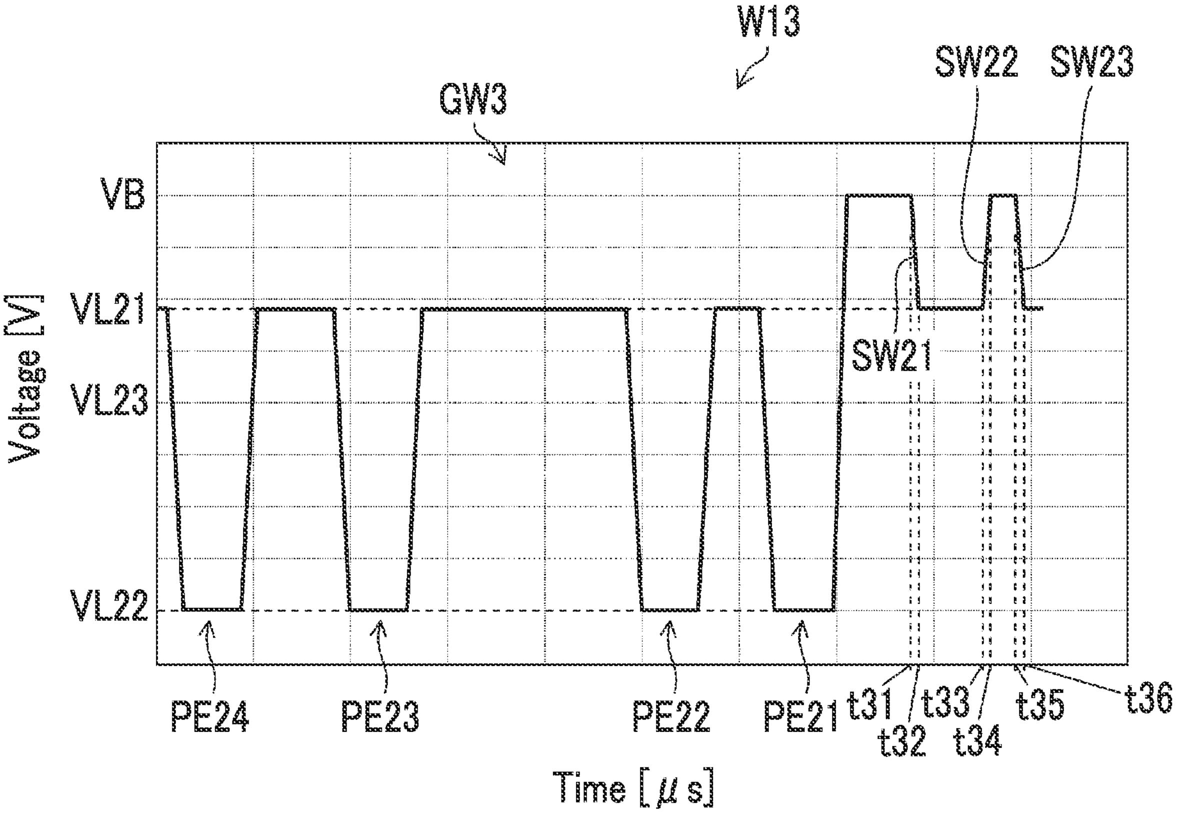
FIG. 14 is a diagram showing another example of a drive waveform of the present disclosure.

FIG. 14 is a diagram showing another example of the drive waveform of the present disclosure in the same manner as in FIG. 8, and shows one drive period. A drive waveform W13 includes a jetting pulse group GW3, a first voltage swing SW21, a second voltage swing SW22, and a third voltage swing SW23 within one drive period.

The jetting pulse group GW3 includes a first jetting pulse PE21, a second jetting pulse PE22, a third jetting pulse PE23, and a fourth jetting pulse PE24 for jetting ink droplets from the nozzle 54.

The dispositions and pulse widths of the first jetting pulse PE21, the second jetting pulse PE22, the third jetting pulse PE23, and the fourth jetting pulse PE24 are the same as those of the first jetting pulse PE11, the second jetting pulse PE12, the third jetting pulse PE13, and the fourth jetting pulse PE14 of the drive waveform W12.

Each of the second jetting pulse PE22, the third jetting pulse PE23, and the fourth jetting pulse PE24 has a start end and a terminal end of VL21, and has an amplitude of |VL21−VL22|. In this way, each of the second jetting pulse PE22, the third jetting pulse PE23, and the fourth jetting pulse PE24 has an amplitude that does not return to the bias voltage. In this way, in the jetting pulse group GW3, the voltage of the jetting pulse may not return to the bias voltage.

The first jetting pulse PE21 has a start end of VL21 and an amplitude of a falling slope of |VL21−VL22|. The first jetting pulse PE21 has a terminal end of the bias voltage VB and an amplitude of a rising slope of |VB−VL22|.

The first voltage swing SW21, the second voltage swing SW22, and the third voltage swing SW23 prevent ink droplets from being jetted from the nozzle 54.

The first voltage swing SW21 is a falling slope in which the voltage linearly drops from the bias voltage VB to the voltage VL21 from a timing t31 to a timing t32. The second voltage swing SW22 is a rising slope in which the voltage linearly rises from the voltage VL21 to the bias voltage VB from a timing t33 to a timing t34.

A start end of the first voltage swing SW21 is disposed at a position separated from the start end of the first jetting pulse PE21 by the first time T1, and a start end of the second voltage swing SW22 is disposed at a position separated from the start end of the first voltage swing SW21 by the second time T2. The first voltage swing SW21 and the second voltage swing SW22 constitute a non-jetting pulse together with a holding portion (timing t32 to timing t33) between the first voltage swing SW21 and the second voltage swing SW22.

The third voltage swing SW23 is a falling slope in which the voltage linearly drops from the bias voltage VB to the voltage VL21 from a timing t35 to a timing t36. A start end of the third voltage swing SW23 is disposed at a position separated from the start end of the first voltage swing SW21 by the third time T3.

A fourth voltage swing may be provided after the third voltage swing SW23. A start end of the fourth voltage swing is disposed at a position separated from the start end of the first voltage swing SW21 by the fourth time T4, or at a position separated from the start end of the third voltage swing SW23 by the fifth time T5.

The fourth voltage swing may be a rising slope in which the voltage rises from the voltage VL21 to the bias voltage VB. In this case, a falling slope in which the voltage drops from the bias voltage VB to the voltage VL21 may be provided after the fourth voltage swing.

In addition, the third voltage swing SW23 may be used as a falling slope in which the voltage drops from the bias voltage VB to a voltage (for example, a voltage VL23) lower than the voltage VL21, and the fourth voltage swing may be used as a rising slope in which the voltage rises from the voltage (for example, the voltage VL23) lower than the voltage VL21 to the voltage VL21.

Even with the drive waveform W13 configured as described above, the same effects as those of the drive waveform W11 and the drive waveform W12 can be obtained.

Effect of Drive Waveform

Figure 15:
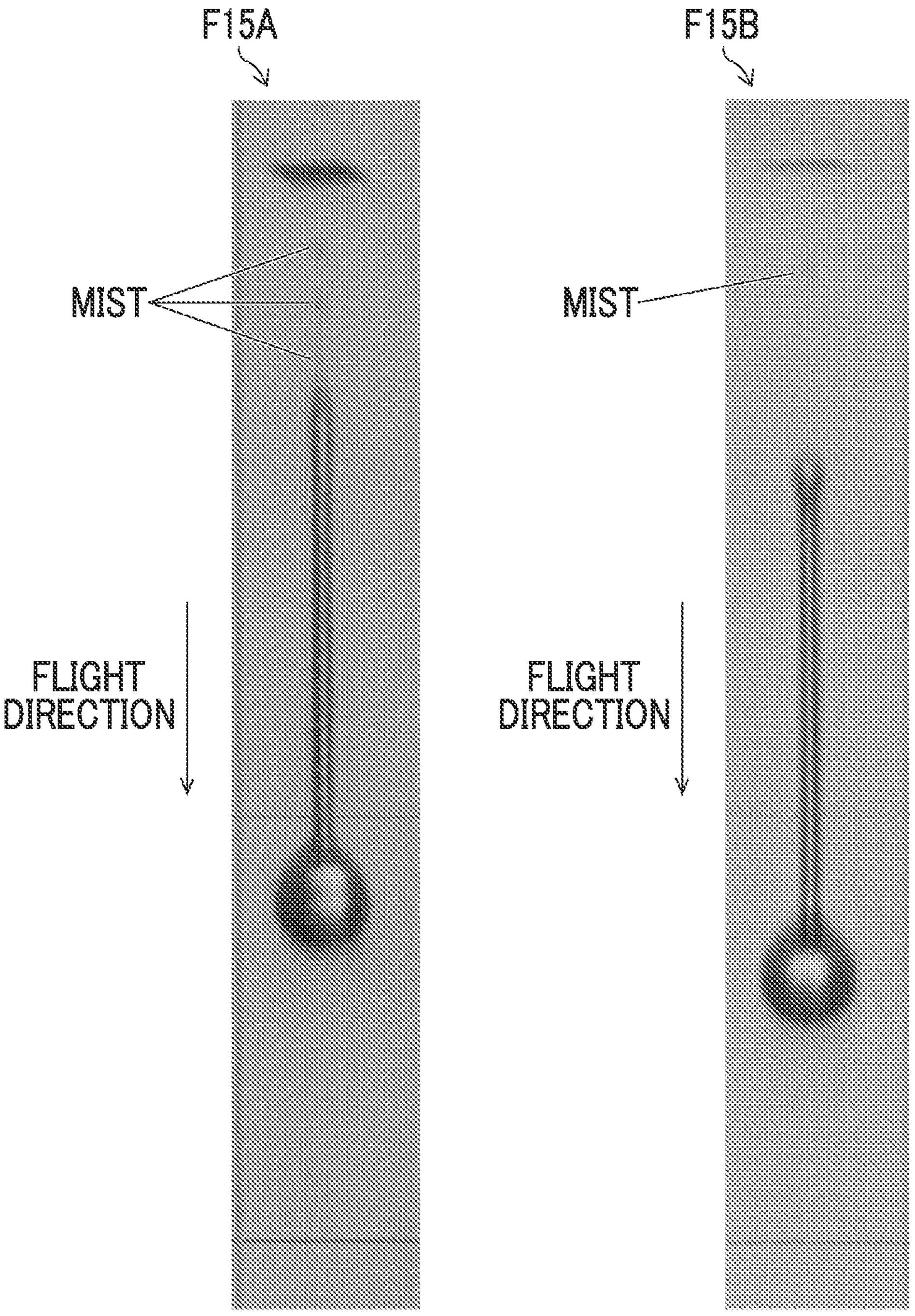
FIG. 15 is a photograph acquired by stroboscopically imaging a state of flight of ink droplets jetted from the nozzle in a case in which a drive waveform is applied to the individual electrode of the piezoelectric element.

FIG. 15 is a photograph acquired by stroboscopically imaging a state of flight of ink droplets jetted from the nozzle 54 in a case in which the drive waveform W13 is applied to the individual electrode 84 of the piezoelectric element 74. F15A of FIG. 15 shows the generation of mist in a case in which the position of the start end of the third voltage swing SW23 is relatively far from a reference position which is separated from the start end of the first voltage swing SW21 by half of the resonance pulse period. In addition, F15B of FIG. 15 shows the generation of mist in a case in which the position of the start end of the third voltage swing SW23 is relatively close to the reference position.

As shown in FIG. 15, by disposing the third voltage swing SW23 at a position close to the reference position, the generation of mist can be suppressed. The position of the start end of the third voltage swing SW23 can be adjusted in a range of 80% or more and 120% or less with reference to the reference position. The position of the start end of the third voltage swing SW23 may be adjusted in a range of 70% or more and 130% or less with reference to the reference position.

Figure 16:
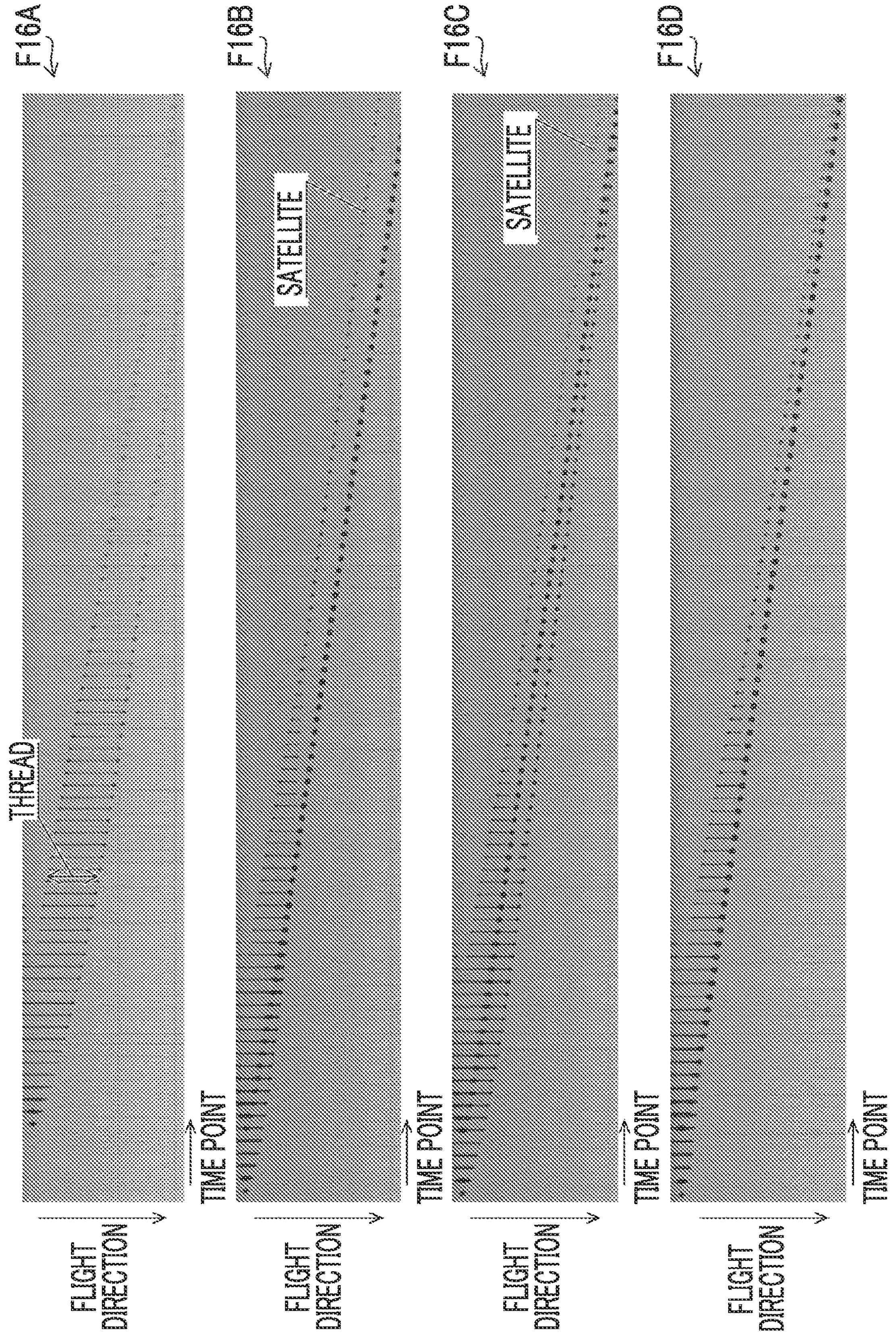
FIG. 16 is a series of photographs acquired by stroboscopically imaging a state of flight of ink droplets jetted from the nozzle in a case in which each waveform element of a drive waveform is applied to the individual electrode of the piezoelectric element, at regular time intervals.

FIG. 16 is a diagram showing a series of photographs acquired by stroboscopically imaging a state of flight of ink droplets jetted from the nozzle 54 in a case in which each waveform element of the drive waveform W13 is applied to the individual electrode 84 of the piezoelectric element 74, at regular time intervals, in the same manner as in FIG. 9.

F16A of FIG. 16 shows a case in which only the first jetting pulse PE21 is applied. In this case, it can be seen that the thread is relatively long and is not cohesive.

F16B of FIG. 16 shows a case in which the first jetting pulse PE21 and the second jetting pulse PE22 are applied, and the position of the start end of the second jetting pulse PE22 is disposed at a position separated from the start end of the first jetting pulse PE21 by the resonance pulse period. In the case of F16B, it can be seen that the ink droplet jetted by the first jetting pulse PE21 and the ink droplet jetted by the second jetting pulse PE22 are coalesced, but the satellite is not coalesced.

F16C of FIG. 16 shows a case in which the first jetting pulse PE21 and the second jetting pulse PE22 are applied, and the position of the start end of the second jetting pulse PE22 is disposed to be shifted from the case of F16B. Here, the start end of the second jetting pulse PE22 is disposed at a position corresponding to 80% of the resonance pulse period from the start end of the first jetting pulse PE21. In the case of F16C, it can be seen that ink droplet formed by coalescing the ink droplet jetted by the first jetting pulse PE21 and the ink droplet jetted by the second jetting pulse PE22, and the satellite main droplet are closer to each other than in the case of F16B.

In this way, by adjusting the position of the second jetting pulse PE22, the satellite cohesion can be improved. The start end of the second jetting pulse PE22 can be adjusted in a range of 80% or more and 120% or less of the resonance pulse period from the start end of the first jetting pulse PE21. The start end of the second jetting pulse PE22 may be adjusted in a range of 70% or more and 130% or less of the resonance pulse period from the start end of the first jetting pulse PE21. With the adjustment in such a range, it is possible to adjust the flight state while maintaining close properties.

F16D of FIG. 16 shows a case in which the first jetting pulse PE21, the second jetting pulse PE22, the first voltage swing SW21, and the second voltage swing SW22 are applied. In the case of F16D, it can be seen that the main droplet formed by coalescing the ink droplet jetted by the first jetting pulse PE21 and the ink droplet jetted by the second jetting pulse PE22, and the satellite are coalesced. In this way, the satellite is improved by the first voltage swing SW21 and the second voltage swing SW22.

As described above, the satellite can be suppressed by the first voltage swing SW21 and the second voltage swing SW22, and the mist can be suppressed by the third voltage swing SW23. In addition, it is possible to obtain better results by adjusting the positions of the jetting pulse and the voltage swing.

In a case in which the surface tensions of the inks are different, a difference is generated in the effect of the drive waveform of the present disclosure. At present, the surface tension of the ink that has no satellite even in the drive waveform in the related art to which the drive waveform of the present disclosure is not applied is 35 mN/m or more.

Therefore, in a case in which the surface tension of the ink is 35 mN/m or less, the effect of the drive waveform of the present disclosure is large. The surface tension of the ink used in the experiments described so far is 29 mN/m, and satellites are generated in the drive waveform to which the drive waveform of the present disclosure is not applied, so that the effect of the drive waveform of the present disclosure is even greater at 30 mN/m or less. The surface tension of the ink is preferably 20 mN/m or more.

As the surface tension of the ink, a value measured at normal temperature using an automatic surface tension meter CBVP-Z (manufactured by Kyowa Interface Science Co., Ltd.) can be used.

Others

The technical scope of the present invention is not limited to the scope described in the above embodiments. The configurations and the like in each embodiment can be appropriately combined among the respective embodiments without departing from the spirit of the present invention.

EXPLANATION OF REFERENCES

1: paper
10: inkjet printing apparatus
20: transport drum
30: image recording unit
32: image recording drum
32A: gripper
34: paper pressing roller
36: inkjet head
36C: inkjet head
36K: inkjet head
36M: inkjet head
36Y: inkjet head
38: imaging unit
40: transport drum
50A: nozzle surface
52: head module
53: base frame
54: nozzle
70: ejector
72: pressure chamber
74: piezoelectric element
76: nozzle flow passage
78: individual supply passage
80: supply-side common branch flow passage
82: vibration plate
84: individual electrode
86: piezoelectric material
88: cover plate
90: movable space
100: system controller
100A: processor
100B: memory
102: communication unit
104: image memory
106: transport control unit
108: image recording control unit
110: examination unit
112: operation unit
114: display unit
120: waveform generation unit
122: digital-to-analog conversion unit
124: pulse selection switch
126: switch controller
128: bias resistor
200: host computer
C1: holding portion
C2: holding portion
C3: holding portion
GW1: jetting pulse group
GW2: jetting pulse group
GW3: jetting pulse group
P1: pulse
P2: pulse
P11: jetting pulse
P12: jetting pulse
P13: non-jetting pulse
P21: jetting pulse
P22: jetting pulse
P23: non-jetting pulse
PE1: first jetting pulse
PE11: first jetting pulse
PE12: second jetting pulse
PE13: third jetting pulse
PE14: fourth jetting pulse
PE21: first jetting pulse
PE22: second jetting pulse
PE23: third jetting pulse
PE24: fourth jetting pulse
SL1: slope
SL2: slope
SL3: slope
SL4: slope
SW1: first voltage swing
SW2: second voltage swing
SW3: third voltage swing
SW4: fourth voltage swing
SW11: first voltage swing
SW12: second voltage swing
SW13: third voltage swing
SW14: fourth voltage swing
SW21: first voltage swing
SW22: second voltage swing
SW23: third voltage swing
W: drive waveform
W1: drive waveform
W2: drive waveform
W11: drive waveform
W12: drive waveform
W13: drive waveform

What is claimed is:

1. A drive waveform generation device comprising:

one or more processors; and one or more memories that store instructions executed by the one or more processors, wherein the one or more processors generate a drive waveform for driving a liquid droplet jetting element of a liquid jetting head having a nozzle that jets a liquid droplet, a pressure chamber that communicates with the nozzle, and the liquid droplet jetting element that pressurizes a liquid in the pressure chamber according to a supplied drive waveform, the drive waveform includes, within one drive period, a jetting pulse group including one or more jetting pulses for jetting the liquid droplet from the nozzle, and a voltage swing for preventing the liquid droplet from being jetted from the nozzle, three or more voltage swings are disposed after a first jetting pulse which is a last jetting pulse in the jetting pulse group, a start end of a first voltage swing, which is the voltage swing immediately after the first jetting pulse, is disposed at a position separated from a start end of the first jetting pulse by a first time, a start end of a second voltage swing, which is the voltage swing immediately after the first voltage swing, is disposed at a position separated from the start end of the first voltage swing by a second time, wherein a resonance pulse period is a period of two jetting pulses in which a velocity of the liquid droplet jetted in the two jetting pulses is the fastest, wherein the first time is 80% or more and 120% or less of the resonance pulse period, and wherein a resonance pulse width is a pulse width of one jetting pulse in which a velocity of the liquid droplet jetted in the one jetting pulse is the fastest, wherein the second time is 80% or more and 120% or less of the resonance pulse width.

2. The drive waveform generation device according to claim 1, wherein a start end of a third voltage swing, which is the voltage swing immediately after the second voltage swing of the drive waveform, is disposed at a position separated from the start end of the first voltage swing by a third time, and the third time is 80% or more and 120% or less of half of the resonance pulse period.

3. The drive waveform generation device according to claim 2, wherein a start end of a fourth voltage swing, which is the voltage swing immediately after the third voltage swing of the drive waveform, is disposed at a position separated from the start end of the first voltage swing by a fourth time or a position separated from the start end of the third voltage swing by a fifth time, the fourth time is 80% or more and 120% or less of an even multiple of the resonance pulse width, or 80% or more and 120% or less of an integral multiple of the resonance pulse period, and the fifth time is 80% or more and 120% or less of an even multiple of the resonance pulse width, or 80% or more and 120% or less of an integral multiple of the resonance pulse period.

4. The drive waveform generation device according to claim 1, wherein a start end of a second jetting pulse, which is the jetting pulse immediately before the first jetting pulse of the drive waveform, is disposed at a position separated from the start end of the first jetting pulse by a sixth time, and a pulse width of the second jetting pulse is a seventh time, the sixth time is 80% or more and 120% or less of the resonance pulse period, and the seventh time is 80% or more and 120% or less of the resonance pulse width.

5. The drive waveform generation device according to claim 4, wherein, in the drive waveform, the jetting pulse and a non-jetting pulse for preventing the liquid droplet from being jetted from the nozzle are non-disposed between the start end of the second jetting pulse and a position before the second jetting pulse and separated from the start end of the second jetting pulse by an eighth time, and the eighth time is 120% of the resonance pulse period.

6. The drive waveform generation device according to claim 1, wherein the liquid has a surface tension of 35 mN/m or less.

7. The drive waveform generation device according to claim 1, wherein the liquid has a surface tension of 30 mN/m or less.

8. A liquid jetting device comprising:

the drive waveform generation device according to claim 1; and the liquid jetting head having the nozzle that jets the liquid droplet, the pressure chamber that communicates with the nozzle, and the liquid droplet jetting element that pressurizes the liquid in the pressure chamber according to the supplied drive waveform, wherein the one or more processors jet the liquid droplet from the nozzle by supplying the drive waveform generated by the drive waveform generation device to the liquid droplet jetting element.

9. A printing apparatus comprising:

the liquid jetting device according to claim 8; and a relative moving mechanism that moves the liquid jetting head and a base material relative to each other, wherein the one or more processors print an image on the base material by moving the liquid jetting head and the base material relative to each other and jetting the liquid droplet from the nozzle.

10. A drive waveform generation method executed by one or more processors, the method comprising:

causing the one or more processors to execute generating a drive waveform for driving a liquid droplet jetting element of a liquid jetting head having a nozzle that jets a liquid droplet, a pressure chamber that communicates with the nozzle, and the liquid droplet jetting element that pressurizes a liquid in the pressure chamber according to a supplied drive waveform, wherein the drive waveform includes, within one drive period, a jetting pulse group including one or more jetting pulses for jetting the liquid droplet from the nozzle, and a voltage swing for preventing the liquid droplet from being jetted from the nozzle, three or more voltage swings are disposed after a first jetting pulse which is a last jetting pulse in the jetting pulse group, a start end of a first voltage swing, which is the voltage swing immediately after the first jetting pulse, is disposed at a position separated from a start end of the first jetting pulse by a first time, a start end of a second voltage swing, which is the voltage swing immediately after the first voltage swing, is disposed at a position separated from the start end of the first voltage swing by a second time, wherein a resonance pulse period is a period of two jetting pulses in which a velocity of the liquid droplet jetted in the two jetting pulses is the fastest, wherein the first time is 80% or more and 120% or less of the resonance pulse period, and wherein a resonance pulse width a pulse width of one jetting pulse in which a velocity of the liquid droplet jetted in the one jetting pulse is the fastest, wherein the second time is 80% or more and 120% or less of the resonance pulse width.

11. A non-transitory, computer-readable tangible recording medium which records thereon a program for causing, when read by a computer, the computer to execute the drive waveform generation method according to claim 10.

* * * * *